(12) United States Patent
Sato et al.

(10) Patent No.: US 12,729,824 B2
(45) Date of Patent: Sep. 8, 2026

(54) VEHICLE LAMP

(71) Applicant: NICHIA CORPORATION, Anan (JP)

(72) Inventors: Yuji Sato, Anan (JP); Takuya Noichi, Tokushima (JP); Masafumi Sakamoto, Anan (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 18/506,981

(22) Filed: Nov. 10, 2023

(65) Prior Publication Data

US 2024/0159375 A1 May 16, 2024

(30) Foreign Application Priority Data

Nov. 11, 2022 (JP) ................................ 2022-181424
Jun. 22, 2023 (JP) ................................ 2023-102669

(51) Int. Cl.
*F21S 43/249* (2018.01)
*B60Q 1/00* (2006.01)
(Continued)

(52) U.S. Cl.
CPC ........... *F21S 43/249* (2018.01); *F21S 43/239* (2018.01); *F21S 43/243* (2018.01); *F21S 43/26* (2018.01); *F21V 9/32* (2018.02); *B60Q 1/0041* (2013.01); *F21S 41/176* (2018.01); *F21S 41/24* (2018.01); *F21S 43/16* (2018.01); *F21S 43/20* (2018.01); *F21S 43/235* (2018.01); *F21S 43/236* (2018.01); *F21S 43/241* (2018.01); *F21S 43/242* (2018.01);
(Continued)

(58) Field of Classification Search
CPC .......... F21S 41/176; F21S 43/16; F21S 43/20; F21S 43/235; F21S 43/236; F21S 43/239; F21S 43/241; F21S 43/242; F21S 43/245; F21S 43/246; F21S 43/249; F21S 43/2492; F21S 43/253; F21S 43/26; G02B 6/0036; G02B 6/0038; G02B 6/0043; G02B 6/0051
See application file for complete search history.

(56) References Cited

U.S. PATENT DOCUMENTS 9,333,905 B2 5/2016 Nomura et al.
10,288,260 B2 5/2019 Tsukatani et al.
(Continued)

FOREIGN PATENT DOCUMENTS

CN 113167456 A 7/2021
DE 102016114246 A1 2/2018
(Continued)

*Primary Examiner* — Colin J Cattanach
(74) *Attorney, Agent, or Firm* — Hunton Andrews Kurth LLP

(57) ABSTRACT

A vehicle lamp includes a light guide plate including a plurality of light-exiting portions and a low-luminance portion, which is located between adjacent light-exiting portions and outputs light having luminance lower than luminance of light exiting from the light-exiting portion; a plurality of light sources each emit light having a light emission peak wavelength in a range from 420 nm to 550 nm to enter the light guide plate; and a wavelength conversion member that is disposed on the plurality of light-exiting portions and emits light having a light emission peak wavelength in a range from 540 nm to 700 nm by converting a wavelength of the light exiting from the light-exiting portion.

20 Claims, 22 Drawing Sheets

(51) Int. Cl.

| | |
|---|---|
| ***F21S 41/176*** | (2018.01) |
| ***F21S 41/24*** | (2018.01) |
| ***F21S 43/16*** | (2018.01) |
| ***F21S 43/20*** | (2018.01) |
| ***F21S 43/235*** | (2018.01) |
| ***F21S 43/236*** | (2018.01) |
| ***F21S 43/239*** | (2018.01) |
| ***F21S 43/242*** | (2018.01) |
| ***F21S 43/243*** | (2018.01) |
| ***F21S 43/245*** | (2018.01) |
| ***F21V 8/00*** | (2006.01) |
| ***F21V 9/32*** | (2018.01) |
| *F21S 43/241* | (2018.01) |

(52) U.S. Cl.

CPC ............ *F21S 43/245* (2018.01); *F21S 43/246* (2024.05); *F21S 43/2492* (2024.05); *F21S 43/253* (2024.05); *G02B 6/0036* (2013.01); *G02B 6/0038* (2013.01); *G02B 6/0043* (2013.01); *G02B 6/0051* (2013.01)

(56) References Cited

U.S. PATENT DOCUMENTS

| | | | |
|---|---|---|---|
| 2005/0207153 A1 | 9/2005 | Leleve et al. | |
| 2013/0335994 A1 | 12/2013 | Mulder et al. | |
| 2014/0211449 A1 | 7/2014 | Nomura et al. | |
| 2015/0197181 A1* | 7/2015 | Salter | G09F 21/048 315/77 |
| 2015/0252964 A1* | 9/2015 | Takahashi | F21S 41/16 362/84 |
| 2018/0245763 A1 | 8/2018 | Oshima et al. | |
| 2018/0372279 A1 | 12/2018 | Lim et al. | |
| 2019/0234581 A1* | 8/2019 | Iwakura | B60Q 1/34 |
| 2020/0191351 A1* | 6/2020 | Hechtfischer | F21V 29/85 |
| 2021/0041078 A1 | 2/2021 | Park et al. | |
| 2021/0157046 A1* | 5/2021 | Wang | G02B 6/009 |
| 2022/0011494 A1* | 1/2022 | Mertens | G02B 6/006 |
| 2022/0158048 A1* | 5/2022 | Park | F21S 43/255 |

FOREIGN PATENT DOCUMENTS

| | | |
|---|---|---|
| EP | 0933588 A2 | 8/1999 |
| EP | 3181401 B1 | 3/2022 |
| FR | 3032259 A1 | 8/2016 |
| JP | 2009206064 A | 9/2009 |
| JP | 2014146750 A | 8/2014 |
| JP | 2015050148 A | 3/2015 |
| JP | 2020024867 A | 2/2020 |
| JP | 2021003999 A | 1/2021 |
| WO | 2014161941 A1 | 10/2014 |
| WO | 2017033820 A1 | 3/2017 |

* cited by examiner

VEHICLE LAMP

CROSS-REFERENCE TO RELATED APPLICATION

This application claims priority to Japanese Patent Application No. 2022-181424 filed on Nov. 11, 2022, and Japanese Patent Application No. 2023-102669 filed on Jun. 22, 2023, the disclosures of which are hereby incorporated by reference in their entireties.

TECHNICAL FILED

The present disclosure relates to a vehicle lamp.

BACKGROUND

A vehicle is obliged to be provided with, on a rear surface of a vehicle body, a brake light (stop lamp, brake lamp), a direction indicator (turn signal lamp, blinker), a taillight (tail lamp), a backing light (back lamp), and a rear reflector (reflex reflector), and further standards for colors, brightness, and the like of lamp and reflected light are defined for each of them. These various lamps are combined into one unit and attached to the vehicle body as a pair of left and right rear combination lamps. As a typical rear combination lamp, a vehicle lamp that outputs light in two colors or three colors of red for both a brake light (stop) and a taillight (tail) and at least one of amber (orange) for a direction indicator (turn signal) or white for a backing light (back lamp) according to a section partitioned in a region serving as a light extraction portion has been used. A vehicle lamp like a rear combination lamp may also be designed in a unique design as an ornament of a vehicle, depending on a color arrangement or a shape based on a light color.

In such a vehicle lamp, a light-emitting device including a light-emitting diode (LED) or the like as a light source is accommodated in a lamp body provided, on an inner surface thereof, with a reflective film or the like, and an opening portion of the lamp body serving as a light extraction portion is covered with a cover (outer lens) formed of a transparent resin or the like to serve as a light exiting surface. In the vehicle lamp like the rear combination lamp, a structure in which a light guide member including an end surface and the light exiting surface serving as the light extraction portion extending in a direction orthogonal to the end surface is used, light of the light-emitting device is incident on the end surface of the light guide member, and the light is extracted from the light exiting surface of the light guide member is used in some cases. For example, Japanese Patent Publication No. 2009-206064 discloses a vehicle lamp that includes a light guide lens as a light guide member and outputs light in different colors from a plurality of light sources with the same color for each one section of a plurality of partitioned sections in a light exiting surface of the light guide lens. The foregoing Patent Publication discloses the vehicle lamp in which fluorescent resins produced by mixing respectively different phosphors into a light-transmitting resin are each filled in a corresponding one of a plurality of optically separated recessed portions each having a bottom surface and a lateral surface, which is formed of a light-shielding partition wall portion, and LEDs all of which are the same type are disposed with their irradiation directions facing the recessed portions in the vicinity of the light-transmitting wall portions of the respective recessed portions. In the vehicle lamp disclosed in the foregoing Patent Publication, by changing the kind of the phosphor contained in the fluorescent resin filled in each of the recessed portions, light in a color different from that of the light emitted from the light source exits from a portion equivalent to the bottom surface of the corresponding one of the plurality of recessed portions for each of the plurality of recessed portions.

SUMMARY

An object of an aspect of the present disclosure is to provide a vehicle lamp that allows outputting light from each one section of a plurality of partitioned sections in a region serving as a light extraction portion and allows reducing luminance unevenness of light exiting in one section.

A first aspect is a vehicle lamp that includes a light guide plate, a plurality of light sources, and a wavelength conversion member. The light guide plate includes a plurality of light-exiting portions and a low-luminance portion. The low-luminance portion is located between adjacent light-exiting portions of the plurality of light-exiting portions and outputs light having luminance lower than luminance of light exiting from the light-exiting portions. Each of the plurality of light sources emits light having a light emission peak wavelength in a range from 420 nm to 550 nm to enter the light guide plate. The wavelength conversion member is disposed on the plurality of light-exiting portions and emits light having a light emission peak wavelength in a range from 540 nm to 700 nm by converting a wavelength of the light exiting from each of the plurality of light-exiting portions.

A second aspect is a vehicle lamp that includes a plurality of light guide plates, a plurality of light sources, and a wavelength conversion member. Each of the plurality of light guide plates includes a light-exiting portion. Each of the plurality of light sources each emits light having a light emission peak wavelength in a range from 420 nm to 550 nm to enter the corresponding one of the plurality of light guide plates. The wavelength conversion member is disposed on the light-exiting portion and emits light having a light emission peak wavelength in a range from 540 nm to 700 nm by converting a wavelength of the light exiting from the light-exiting portion.

According to an aspect of the present disclosure, the vehicle lamp that allows outputting light from each one section of a plurality of partitioned sections in a region serving as a light extraction portion and allows reducing luminance unevenness of light exiting in one section can be provided.

DETAILED DESCRIPTIONS

Figure 1A:
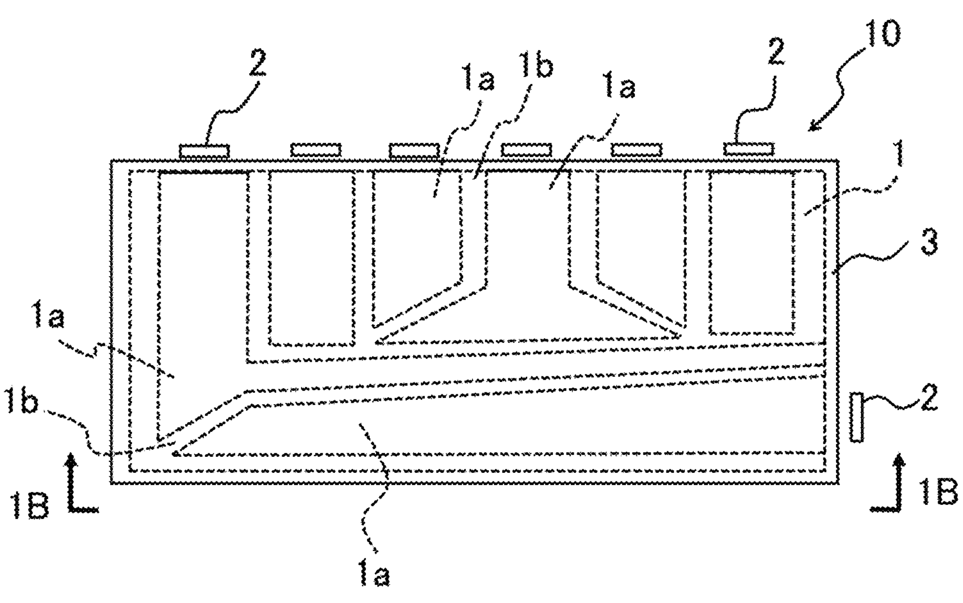
FIG. 1A is a schematic plan view illustrating an example of a vehicle lamp.

Embodiments of the present disclosure will be described below with reference to the drawings. However, the embodiments presented below are examples of a vehicle lamp for embodying a technical concept of the present disclosure, and the present disclosure is not limited to the vehicle lamp described below. Also, the members in the claims are not in any way limited to the members in the embodiments. Especially, dimensions, materials, shapes, relative arrangements, and the like of the components described in the embodiments are not intended to limit the scope of the present disclosure only thereto, unless otherwise specified, and are merely examples for explanation. The relationship between the color name and the chromaticity coordinates, and the relationship between the wavelength range of light and the color name of monochromatic light, and the like conform to JIS Z 8110. Members illustrated in the drawings may be exaggerated in size and positional relationship and may be simplified in shape. In the following description, the same names and reference characters denote members that are the same or of similar material in principle. In the present description, terms, such as "plate," "sheet," "film," and "layer" are not to be distinguished from one another solely based on differences in name. Therefore, for example, the "plate" is used as meaning including a member referred to as a sheet, a film, or a layer, and the "layer" is used as meaning including a member that is possibly referred to as a plate, a sheet, or a film. In the present description, the terms "upper/above" and "lower/below" are also used as a term that refers to a side where light is extracted and a side opposite thereto in a light-emitting device. For example, "upward" refers to the direction in which light is extracted, and "downward" refers to the opposite direction thereof. For example, an "upper surface" refers to a surface located on a side where light is extracted, while a "lower surface" refers to a surface located opposite thereto. Furthermore, a lateral surface refers to a surface in a direction orthogonal to the upper surface or the lower surface.

A vehicle lamp according to a first aspect includes a light guide plate, a plurality of light sources, and a wavelength conversion member. The light guide plate includes a plurality of light-exiting portions and a low-luminance portion. The low-luminance portion is located between adjacent light-exiting portions of the plurality of light-exiting portions, and outputs light having luminance lower than luminance of light exiting from the light-exiting portions. The plurality of light sources individually emit light having a light emission peak wavelength in a range from 420 nm to 550 nm to enter the light guide plate. The wavelength conversion member is disposed above the plurality of light-exiting portions and emits light having a light emission peak wavelength in a range from 540 nm to 700 nm by converting a wavelength of the light exiting from the plurality of light-exiting portions.

An example of the vehicle lamp is described below with reference to the drawings. A size and an arrangement relationship of each member in the drawings are merely examples and are exaggerated in some cases.

Figure 1B:
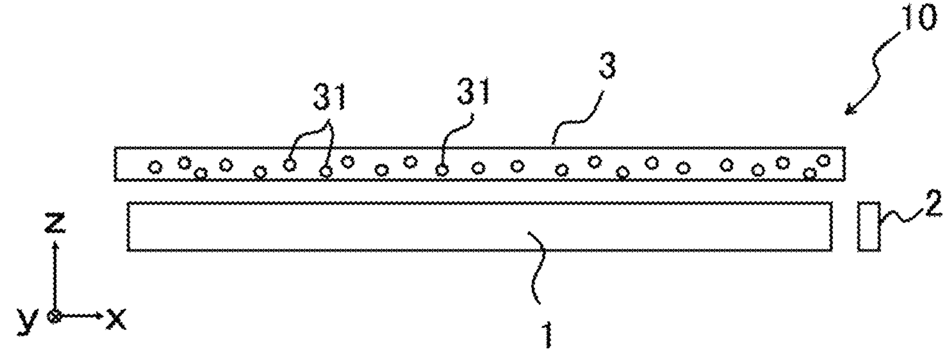
FIG. 1B is a schematic lateral view of the vehicle lamp illustrated in FIG. 1A as seen along an arrow 1B direction.

FIG. 1A is a schematic plan view illustrating an example of a vehicle lamp 10 of the first aspect. FIG. 1B is a schematic lateral view of the vehicle lamp 10 illustrated in FIG. 1A as seen along an arrow 1B direction. The vehicle lamp 10 includes a light guide plate 1, a plurality of light sources 2, and a wavelength conversion member 3. The light guide plate 1 includes a plurality of light-exiting portions 1*a* and a low-luminance portion 1*b*. The low-luminance portion 1*b* is located between light-exiting portions 1*a* adjacent to each other and outputs light having luminance lower than luminance of light exiting from the light-exiting portion 1*a*. The plurality of light sources 2 individually emit light having a light emission peak wavelength in a range from 420 nm to 550 nm to enter the light guide plate 1. The wavelength conversion member 3 is disposed above the plurality of light-exiting portions 1*a* and emits light having a light emission peak wavelength in a range from 540 nm to 700 nm by converting a wavelength of the light exiting from the light-exiting portion 1*a*. The wavelength conversion member 3 contains at least one kind of the phosphor 31 described below. The direction in which the light exits from the light-exiting portion 1*a* and is emitted from the wavelength conversion member 3 means a +z direction in the drawing. When the vehicle lamp 10 including the light guide plate 1 is disposed on a vehicle body, a region serving as a light extraction portion is formed in the light emission direction of the wavelength conversion member 3. In FIG. 1B, the wavelength conversion member 3 is isolated from the light guide plate 1 and disposed above the light guide plate 1. The wavelength conversion member 3 may be disposed in direct contact with the upper surface of the light guide plate 1.

Figure 2A:
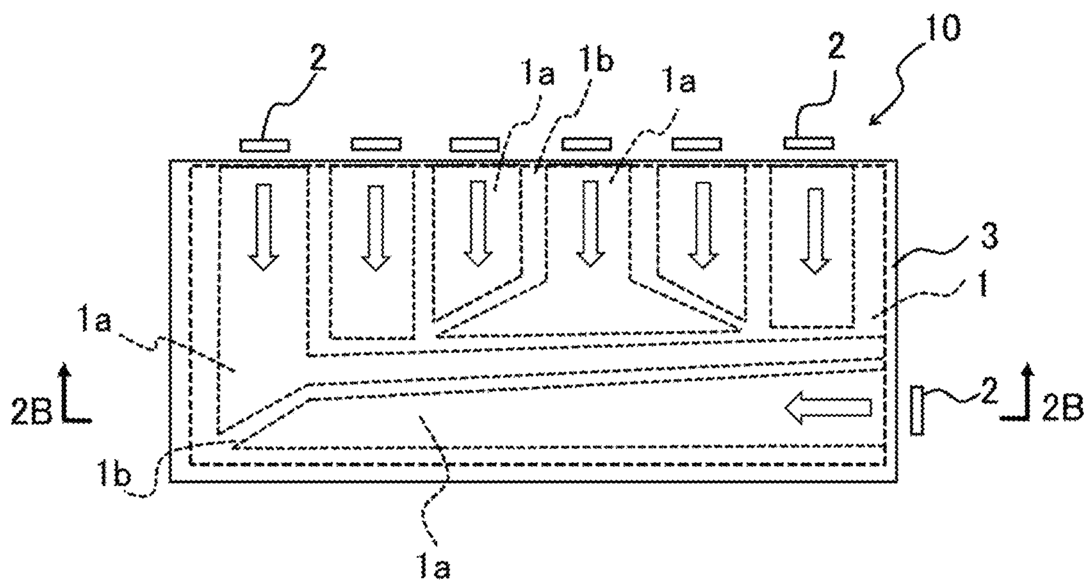
FIG. 2A is an illustration diagram illustrating a state of light entering each of the light-exiting portions from the corresponding one of the light sources in the schematic plan view of a vehicle lamp.
Figure 2B:
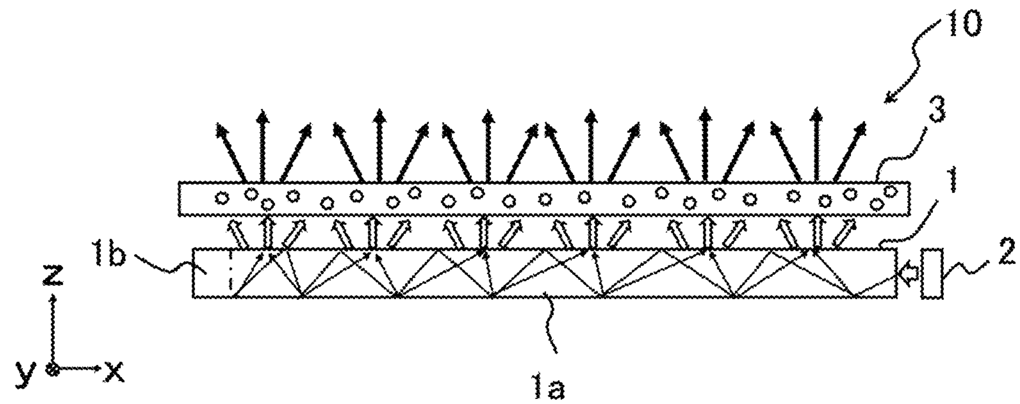
FIG. 2B is an illustration diagram illustrating a state of light in a schematic cross section of the vehicle lamp illustrated in FIG. 2A as seen along an arrow 2B direction.

FIG. 2A is an illustration diagram illustrating a state of light entering each of the light-exiting portions 1*a* from the corresponding one of the light sources 2 in the schematic plan view of the vehicle lamp 10. In FIG. 2A, the arrows indicate the state of light. FIG. 2B is an illustration diagram illustrating a state of light in a schematic cross section of the vehicle lamp illustrated in FIG. 2A as seen along an arrow 2B direction. FIG. 2B schematically illustrates the light-exiting portions 1*a* and the low-luminance portion 1*b* provided in the light guide plate 1. In FIG. 2B, the arrows indicate the state of light. The vehicle lamp 10 includes the plurality of light-exiting portions 1*a* in the light guide plate 1, and the plurality of light sources 2 are disposed at positions where light enters the light-exiting portions 1*a*. The wavelength conversion member 3 is disposed so as to cover the plurality of light-exiting portions 1*a*. The light entered the light guide plate 1 from the light source 2 is guided and deflected in the optical path inside the light guide plate 1, and the light is diffused and exits from the light-exiting portion 1*a*. The wavelength of the light exiting from the light-exiting portion 1*a* is converted by the phosphor 31 included in the wavelength conversion member 3, and the light is further diffused by the wavelength conversion member 3. Therefore, light with reduced luminance unevenness can exit from the entire surface of the light-exiting portion 1*a*.

Figure 3A:
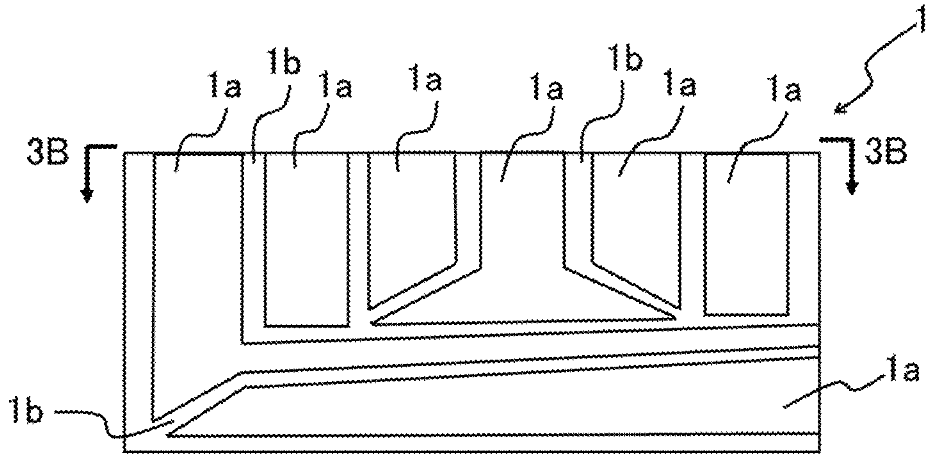
FIG. 3A is a schematic plan view illustrating an example of a light guide plate provided with a vehicle lamp.
Figure 3B:
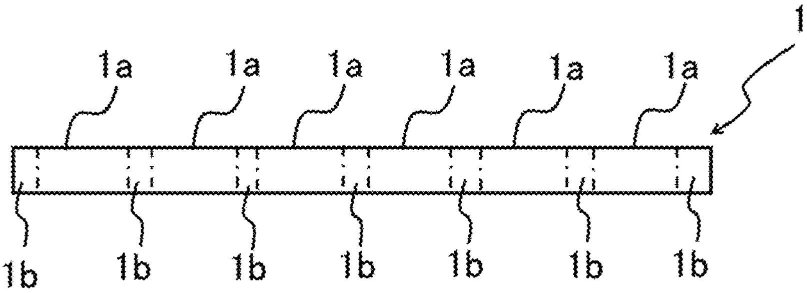
FIG. 3B is a schematic lateral view of the light guide plate in FIG. 3A as seen along an arrow 3B direction.

An example of the light guide plate used in the vehicle lamp is described with reference to the drawings. FIG. 3A is a schematic plan view illustrating an example of the light guide plate 1 provided with the vehicle lamp of the first aspect. FIG. 3B is a schematic lateral view of the light guide plate 1 in FIG. 3A as seen along an arrow 3B direction. The light guide plate 1 includes the plurality of light-exiting portions 1*a* and the low-luminance portion 1*b*. The low-luminance portion 1*b* is located between the light-exiting portions 1*a* adjacent to each other and outputs light having luminance lower than luminance of light exiting from the individual light-exiting portions 1*a*. The light guide plate 1 is partitioned into a plurality of sections by the light-exiting portions 1*a* and the low-luminance portion 1*b*. In the vehicle lamp 10 including the light guide plate 1, when the light guide plate 1 is used as a surface light source, light exits from one section partitioned into a plurality of sections by the light-exiting portions 1*a* and the low-luminance portion 1*b* of the light guide plate 1 in a region serving as the light extraction portion where the surface light source is disposed. Light can exit from one light-exiting portion 1*a* serving as one section in the region serving as the light extraction portion of the vehicle lamp 10, and light having a different color can exit from each section that has been partitioned such that the light guide plate 1 including the plurality of light-exiting portions 1*a* serves as the surface light source. The light guide plate 1 guides entered light, deflects the optical path of the guided light, and outputs the light from the light-exiting portions 1*a*. The light guide plate 1 can be formed of a transparent material having a relatively high refractive index. Examples of a material for forming the light guide plate 1 include a polycarbonate (PC) resin, a polymethyl methacrylate resin (PMMA), a polyacrylate resin, an acrylic resin, and glass.

Figure 3C:
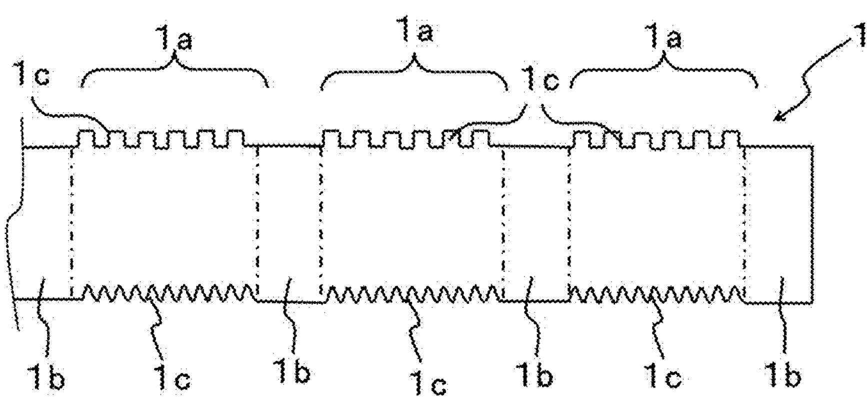
FIG. 3C is a partially enlarged lateral view illustrating an example of a light guide plate in a vehicle lamp.

FIG. 3C is a partially enlarged lateral view illustrating an example of the light guide plate 1. As an example, in the light guide plate 1, protrusions and recessions 1*c* are formed on the light-exiting portion 1*a* side and/or the opposite side of the light-exiting portions 1*a*. The protrusions and recessions 1*c* deflect the optical path of the light entered and guided by the light guide plate 1 and output the light from the light-exiting portions 1*a*. The low-luminance portion 1*b* in which the protrusions and recessions 1*c* are not formed, the quantity of the protrusions and recessions 1*c* is small, or the like is disposed between the adjacent light-exiting portions 1*a*. Because, for example, the protrusions and recessions 1*c* are not formed in the low-luminance portion 1*b*, light output to the outside of the light guide plate 1 tends to be reduced, and the optical path of light is deflected inside the low-luminance portion 1*b* of the light guide plate 1. Instead of providing the protrusions and recessions 1*c*, for example, a resin layer containing a light diffusing agent having a refractive index higher than that of a base material of the light guide plate 1 may be disposed on the lower surface side of a portion of the light guide plate 1 located below the light-exiting portions 1*a*, and a resin layer containing a light diffusing agent having a refractive index lower than that of the base material of the light guide plate 1 may be disposed on the lower surface side of a portion of the light guide plate 1 located below the low-luminance portion 1*b*. The protrusions and recessions 1*c* serving as the light-exiting portion 1*a* may be formed with a mold during molding the light guide plate 1, and the protrusions and recessions 1*c* may be formed by printing such as screen printing or silk printing. Furthermore, the protrusions and recessions 1*c* may be formed by sand blasting or the like.

The light source preferably emits light having the light emission peak wavelength in a range from 420 nm to 550 nm. The light source may be a light-emitting element or may be a light-emitting device including a light-emitting element and a package in which the light-emitting element is to be disposed. Furthermore, the plurality of light sources may emit light having different light emission peak wavelengths. The light source may be a light source that emits light having a light emission peak wavelength in a range from 420 nm to 470 nm. The light source may be a light source that emits light having a light emission peak wavelength in a range from 500 nm to 550 nm. The light source may be a light source that emits light having a light emission peak wavelength in a range from 470 nm to 550 nm. For example, a light-emitting diode (LED) or a laser diode (LD) can be used as the light-emitting element. A semiconductor light-emitting element using a nitride semiconductor represented by $In_XAl_YGa_{1-X-Y}N$ ($0 \leq X$, $0 \leq Y$, $X+Y \leq 1$) can be used for the light-emitting element. Various emission wavelengths of the nitride semiconductor can be selected depending on a material for a semiconductor layer and the degree of mixed crystals of the semiconductor layer. The light-emitting element is not particularly limited in shape, size, mounting form (flip chip, wire bonding), and the like as long as the light-emitting element emits light by an amount necessary for the vehicle lamp.

As the wavelength conversion member, a plate-like, sheet-like, or layer-like member containing a light-transmissive material and a phosphor can be used. The light-transmissive material includes at least one kind selected from the group consisting of a resin, glass, and an inorganic material. The resin used for the light-transmissive material is preferably at least one kind selected from the group consisting of an epoxy resin, a silicone resin, a phenol resin, and a polyimide resin. The inorganic material used for the light-transmissive material includes at least one kind selected from the group consisting of aluminum oxide and aluminum nitride. The wavelength conversion member may contain, in addition to the light-transmissive material and the phosphor, a light diffusing agent, a colorant, and the like, as necessary. Examples of the light diffusing agent include silicon oxide, barium titanate, titanium oxide, and aluminum oxide. When the wavelength conversion member contains a light diffusing agent, the light diffusing agent is preferably formed of a material having a refractive index different from the refractive index of the light-transmissive material. When the light-transmissive material of the wavelength conversion member is, for example, a silicone resin, at least one kind of an inorganic material selected from the group consisting of aluminum oxide and aluminum nitride having a refractive index different from a refractive index of the silicone resin can be used as the light diffusing agent.

The thickness of the wavelength conversion member is preferably in a range from 18 μm to 100 μm, more preferably in a range from 20 μm to 100 μm, still more preferably in a range from 22 μm to 90 μm, yet still more preferably in a range from 23 μm to 90 μm, may be in a range from 30 μm to 90 μm, or may be in a range from 40 μm to 80 μm. When the thickness of the wavelength conversion member is in a range from 18 μm to 100 μm, the desired conten of phosphor can be contained in the wavelength conversion member so as to be in the target wavelength range with heat dissipation of the wavelength conversion member maintained. In addition, when the thickness of the wavelength conversion member is in a range from 18 μm to 100 μm, the vehicle lamp is easily accommodated in a lamp body mounted on the vehicle body.

The wavelength conversion member contains at least one kind of phosphor and may contain two or more kinds of phosphors having different compositions and light emission peak wavelengths.

The wavelength conversion member preferably contains at least one kind of phosphor selected from the group consisting of a rare-earth-aluminate phosphor having a composition represented by the following Formula (1) (hereinafter also referred to as "YAG phosphor"), a first nitride phosphor having a composition represented by the following Formula (2) (hereinafter also referred to as "α-SiAlON phosphor"), a second nitride phosphor having a composition represented by the following Formula (3) (hereinafter also referred to as "BSESN phosphor"), a third nitride phosphor having a composition represented by the following Formula (4) (hereinafter also referred to as "SCASN phosphor"), a fourth nitride phosphor having a composition represented by the following Formula (5) (hereinafter also referred to as "CASN phosphor"), a fifth nitride phosphor having a composition represented by the following Formula (6) (hereinafter also referred to as "SLA phosphor"), a first fluoride phosphor having a composition represented by the following Formula (7) (hereinafter also referred to as "KSF phosphor"), and a second fluoride phosphor having a composition represented by the following Formula (8) (hereinafter also referred to as "KSAF phosphor").

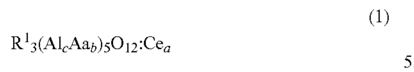

$$R^1_3(Al_cAa_b)_5O_{12}:Ce_a \quad (1)$$

In Formula (1), $R^1$ is at least one kind selected from the group consisting of Y, Gd, Lu and Tb, and a, b, and c satisfy $0<a\leq0.22$, $0\leq b\leq0.4$, $0<c\leq1.1$, and $0.9\leq b+c\leq1.1$.

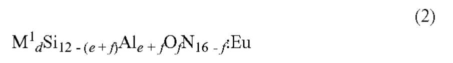

$$M^1_dSi_{12-(e+f)}Al_{e+f}O_fN_{16-f}:Eu \quad (2)$$

In Formula (2), $M^f$ contains at least one kind of element selected from the group consisting of Li, Mg, Ca, Sr, Y, and lanthanoid elements (excluding La and Ce), and d, e, and f satisfy $0<d\leq2.0$, $2.0\leq e\leq6.0$, and $0\leq f\leq1.0$, respectively.

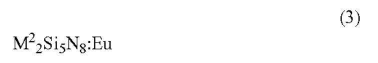

$$M^2_2Si_5N_8:Eu \quad (3)$$

In Formula (3), $M^2$ is an alkaline earth metal element containing at least one kind selected from the group consisting of Ca, Sr, and Ba.

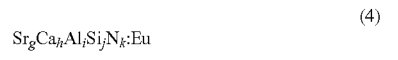

$$Sr_gCa_hAl_iSi_jN_k:Eu \quad (4)$$

In Formula (4), g, h, i, j, and k satisfy $0\leq g<1$, $0<h\leq1$, $g+h\leq1$, $0.9\leq i\leq1.1$, $0.9\leq j\leq1.1$, and $2.5\leq k\leq53.5$.

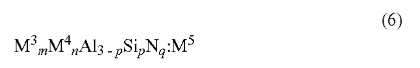

$$M^3_mM^4_nAl_{3-p}Si_pN_q:M^5 \quad (6)$$

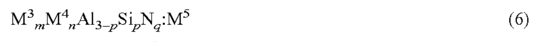

$$M^3_mM^4_nAl_{3-p}Si_pN_q:M^5 \quad (6)$$

In Formula (6), $M^3$ is at least one kind of element selected from the group consisting of Ca, Sr, Ba, and Mg, $M^4$ is at least one kind of element selected from the group consisting of Li, Na, and K, $M^5$ is at least one kind of element selected from the group consisting of Eu, Ce, Tb, and Mn, and m, n, p, and q satisfy $0.80\leq m\leq1.05$, $0.80\leq n\leq1.05$, $0\leq p\leq0.5$, and $3.0\leq q\leq5.0$, respectively.

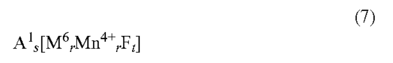

$$A^1_s[M^6_rMn^{4+}_rF_t] \quad (7)$$

In Formula (7) above, $A^1$ is at least one kind of ion selected from the group consisting of $K^+$, $Li^+$, $Na^+$, $Rb^+$, $Cs^+$, and $NH_4^+$, $M^6$ is at least one kind of element selected from the group consisting of Group 4 elements and Group 14 elements, r satisfies $0<r<0.2$, s is an absolute value of electric charge of $[M^6_{1-r}Mn^{4+}F_t]$ ion, and t satisfies $5<t<7$. In Formula (7) above, $A^1$ preferably contains at least $K^+$, and $M^6$ preferably contains at least Si.

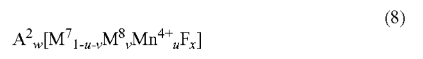

$$A^2_w[M^7_{1-u-v}M^8_vMn^{4+}_uF_x] \quad (8)$$

In Formula (8) above, $A^2$ is at least one kind of ion selected from the group consisting of $K^+$, $Li^+$, $Na^+$, $Rb^+$, $Cs^+$, and $NH_4^+$, $M^7$ is at least one kind of element selected from the group consisting of Group 4 and Group 14, $M^8$ is at least one kind of element selected from the group consisting of Group 13, u satisfies $0<u<0.2$, w is an absolute value of electric charge of $[M^7_{1-u-v}M^8_vMn^{4+}_uF_x]$ ion, v satisfies $0<v\leq0.1$, and x satisfies $5<x<7$. In Formula (8), $A^2$ preferably contains at least $K^+$, $M^7$ preferably contains at least Si, and $M^8$ preferably contains at least Al.

The volume average particle diameter of the phosphor is preferably in a range from 5 μm to 35 μm, more preferably in a range from 6 μm to 35 μm, even more preferably in a range from 6 μm to 30 μm, still more preferably in a range from 6 μm to 20 μm, and particularly preferably in a range from 6 μm to 15 μm. With the volume average particle diameter of the phosphor in a range from 5 μm to 35 μm, the thickness of the wavelength conversion member containing the phosphor can be thinned, and the vehicle lamp can be easily accommodated in the lamp body mounted on the vehicle body. With the volume average particle diameter of the phosphor in a range from 6 μm to 35 μm, the thickness of the wavelength conversion member can be thinned, and the weight can be reduced. The volume average particle diameter of the phosphor refers to the particle size reaching an accumulation of 50% from the small diameter side in a particle size distribution based on volume. A laser diffraction particle size distribution measuring apparatus (for example, Master Sizer 3000 manufactured by Malvern Panalytical Ltd.) can measure a particle size distribution based on volume of the phosphor.

When the volume average particle diameter of the phosphor is in a range from 5 μm to 35 μm, the thickness of the wavelength conversion member containing the phosphor can be thinned to be in a range from 18 μm to 100 μm, which is preferable. The wavelength conversion member containing the phosphor having the volume average particle diameter of the phosphor in a range from 6 μm to 35 μm allows the thickness of the wavelength conversion member to be thin, which is preferable. The wavelength conversion member containing the phosphor having the volume average particle diameter of the phosphor in a range from 6 μm to 30 μm allows the thickness of the wavelength conversion member to be thin to be in a range from 18 μm to 70 μm, which is more preferable. When the volume average particle diameter of the phosphor is in a range from 6 μm to 20 μm, the thickness of the wavelength conversion member containing the phosphor can be thin to be in a range from 22 μm to 35 μm, which is further preferable. When the volume average particle diameter of the phosphor is in a range from 6 μm to 15 μm, the thickness of the wavelength conversion member containing the phosphor can be thin to be in a range from 22 μm to 30 μm, which is further more preferable. In addition, the wavelength conversion member containing the phosphor having the volume average particle diameter in a range from 5 μm to 35 μm allows emitting light with high luminous intensity even when the thickness of the wavelength conversion member is thin. The use of the wavelength conversion member capable of emitting high-luminous-intensity light allows further reducing luminance unevenness of light exiting from the light-exiting portion.

In the case of the wavelength conversion members having the same area, the thicknesses of the wavelength conversion members are volume ratios of the respective wavelength conversion members. In consideration of the volume ratios of the wavelength conversion members, the amount of the phosphor in consideration of the volume of the wavelength conversion member represented by the product of the thickness of the wavelength conversion member and the content (parts by mass) of the phosphor in the wavelength conversion member per 100 parts by mass of the light-transmissive material in the wavelength conversion member is preferably in a range from 2000 parts by mass to 14000 parts by mass. With the amount of the phosphor in consideration of the volume of the wavelength conversion member is in a range from 2000 parts by mass to 14000 parts by mass, high-luminous-intensity light can be emitted even when the thickness of the wavelength conversion member is thin, in a range from 18 μm to 100 μm. When the thickness of the wavelength conversion member is in a range from 20 μm to 70 μm, the amount of the phosphor in consideration of the volume of the wavelength conversion member may be in a range from 2500 parts by mass to 13200 parts by mass. When the thickness of the wavelength conversion member is in a range from 22 μm to 35 am, the amount of the phosphor in consideration of the volume of the wavelength conversion member may be in a range from 2500 parts by mass to 10000 parts by mass. When the thickness of the wavelength conversion member is in a range from 22 μm to 30 μm, the amount of the phosphor in consideration of the volume of the wavelength conversion member may be in a range from 2500 parts by mass to 8000 parts by mass or may be in a range from 2600 parts by mass to 6000 parts by mass.

When the volume average particle diameter of the phosphor is in a range from 5 μm to 35 μm, the thickness of the wavelength conversion member containing the phosphor can be thin to be in a range from 18 μm to 100 μm, the amount of the phosphor in consideration of the volume of the wavelength conversion member represented by the product of the thickness of the wavelength conversion member having equal area and the content of the phosphor in the wavelength conversion member per 100 parts by mass of the light-transmissive material in the wavelength conversion member can be in a range from 2000 parts by mass to 14000 parts by mass. Therefore, in a case of emitting light having equal dominant wavelength, the high-luminous-intensity light can be emitted.

When the volume average particle diameter of the phosphor is in a range from 6 μm to 30 μm, the thickness of the wavelength conversion member containing the phosphor can be thin to be in a range from 20 μm to 70 μm, the amount of the phosphor in consideration of the volume of the wavelength conversion member can be in a range from 2500 parts by mass to 13200 parts by mass even when the thickness of the wavelength conversion member is thin. Therefore, in a case of emitting light having equal dominant wavelength, the high-luminous-intensity light can be emitted.

When the volume average particle diameter of the phosphor is in a range from 6 μm to 20 μm, the thickness of the wavelength conversion member containing the phosphor can be thinner to be in a range from 22 μm to 35 μm, the amount of the phosphor in consideration of the volume of the wavelength conversion member can be in a range from 2500 parts by mass to 10000 parts by mass even when the thickness of the wavelength conversion member is thinner. Therefore, in a case of emitting light having equal dominant wavelength, the high-luminous-intensity light can be emitted.

When the volume average particle diameter of the phosphor is in a range from 6 μm to 15 am, the thickness of the wavelength conversion member containing the phosphor can be thinner to be in a range from 22 μm to 30 μm, the amount of the phosphor in consideration of the volume of the wavelength conversion member can be in a range from 2500 parts by mass to 8000 parts by mass and more preferably in a range from 2600 parts by mass to 6000 parts by mass even when the thickness of the wavelength conversion member is thinner. Therefore, in a case of emitting light having equal dominant wavelength, the high-luminous-intensity light can be emitted.

When the wavelength conversion member contains the fourth nitride phosphor (CASN phosphor) represented by Formula (5) and the volume average particle diameter of the CASN phosphor is in a range from 5 μm to 35 μm, as long as the mass (mg) of the phosphor relative to the area ($cm^2$) of the wavelength conversion member is in a range from 1.50 μmg/$cm^2$ to 9.00 μmg/$cm^2$, the decrease in luminous intensity is suppressed and the thickness of the wavelength conversion member can be thin.

When the wavelength conversion member contains the CASN phosphor and the volume average particle diameter of the CASN phosphor is in a range from 6 μm to 30 μm, the mass (mg) of the phosphor relative to the area ($cm^2$) of the wavelength conversion member can be in a range from 2.00 μmg/$cm^2$ to 8.50 μmg/$cm^2$. Thus, the thickness of the wavelength conversion member can be thin while the suitable amount of the phosphor (mass: mg) is contained relative to the area of the wavelength conversion member, and the high-luminous-intensity light can be emitted.

When the wavelength conversion member contains the CASN phosphor, the volume average particle diameter of the CASN phosphor is in a range from 6 μm to 15 μm, and the wavelength conversion member does not contain a light diffusing agent, the mass (mg) of the phosphor relative to the area ($cm^2$) of the wavelength conversion member can be in a range from 3.00 μmg/$cm^2$ to 4.00 μmg/$cm^2$. Thus, the thickness of the wavelength conversion member can be thin while the suitable amount of the phosphor is contained relative to the area of the wavelength conversion member, and the high-luminous-intensity light can be emitted.

When the wavelength conversion member contains the CASN phosphor, the volume average particle diameter of the CASN phosphor is in a range from 6 μm to 15 μm, and the wavelength conversion member contains the light diffusing agent, the mass (mg) of the phosphor relative to the area ($cm^2$) of the wavelength conversion member can be in a range from 2.00 mg/$cm^2$ to 4.00 mg/$cm^2$. Compared with a case of not containing the light diffusing agent, even when the amount of phosphor is small relative to the area of the wavelength conversion member, the thickness of the wavelength conversion member can be thin, and the high-luminous-intensity light can be emitted.

The wavelength conversion member preferably contains at least one kind selected from the group consisting of a first fluoride phosphor (KSF phosphor) having the composition represented by Formula (7) and a second fluoride phosphor (KSAF phosphor) having the composition represented by Formula (8). Using the KSF phosphor or the KSAF phosphor can adjust afterglow time of the light emitted from the phosphor by changing the elements contained in the composition and their molar ratios to adjust the composition. When the afterglow time of the light emission of the phosphor can be adjusted, light that looks fantastic can be emitted from the wavelength conversion member containing the phosphor. For example, when the afterglow time is long, the outline of the light-exiting portion is blurred, and the light in the light extraction portion is likely to be seen fantastically. In the afterglow time, the phosphor is irradiated with the excitation light, change in emission intensity of the light emitted from the phosphor over time is measured based on the time point when the irradiation of excitation light is cut off, the emission intensity of the phosphor when the phosphor is irradiated with the excitation light is defined as reference intensity of 100%, and time when the emission intensity of the phosphor becomes 10% intensity relative to the reference intensity of 100% can be regarded as the afterglow time. As for the excitation light, for example, the phosphor can be irradiated with light having a light emission peak wavelength of 450 nm as the excitation light. The emission intensity of light emitted from the phosphor can be measured by using a spectrophotometer (for example, product name: F-7000, manufactured by Hitachi High-Technologies Corporation).

The afterglow time of light emission of the KSF phosphor or the KSAF phosphor is preferably adjusted to be in a range from 5 ms to 20 ms. When the afterglow time of the phosphor is in a range from 5 ms to 20 ms, the outline of the light-exiting portion is blurred, and more fantastic irradiation light can be emitted.

In the KSF phosphor, when the element $A^1$ is K and the element $M^6$ is Si in the composition represented by Formula (7), for example, by setting the element $M^6$ to Ge, the afterglow time of light emission of the phosphor can be set to 13 ms.

In the KSF phosphor, when the element $A^1$ is K and the element $M^6$ is Si in the composition represented by Formula (7), for example, by setting the element $A^1$ to Na and the element $M^6$ to Ge, the afterglow time of light emission of the phosphor can be set to 9 ms.

In the KSF phosphor, when the element $A^1$ is K and the element $M^6$ is Si in the composition represented by Formula (7), for example, by setting the element $A^1$ to Cs and the element $M^6$ to be Ti, the afterglow time of light emission of the phosphor can be set to 7 ms.

In the KSAF phosphor, when the element $A^2$ is K, the element $M^7$ is Si, and the element $M^8$ is Al in the composition represented by Formula (8), for example, by setting the element $M^7$ to Ge, the afterglow time of light emission of the phosphor can be set to 13 ms.

In the KSAF phosphor, when the element $A^2$ is K, the element $M^7$ is Si, and the element $M^8$ is Al in the composition represented by Formula (8), for example, by setting the element $A^2$ to Na and the element $M^7$ to Ge, the afterglow time of light emission of the phosphor can be set to 9 ms.

In the KSAF phosphor, when the element $A^2$ is K, the element $M^7$ is Si, and the element $M^8$ is Al in the composition represented by Formula (8), for example, by setting the element $A^2$ to Cs and the element $M^7$ to Ti, the afterglow time of light emission of the phosphor can be set to 7 ms.

Figure 4:
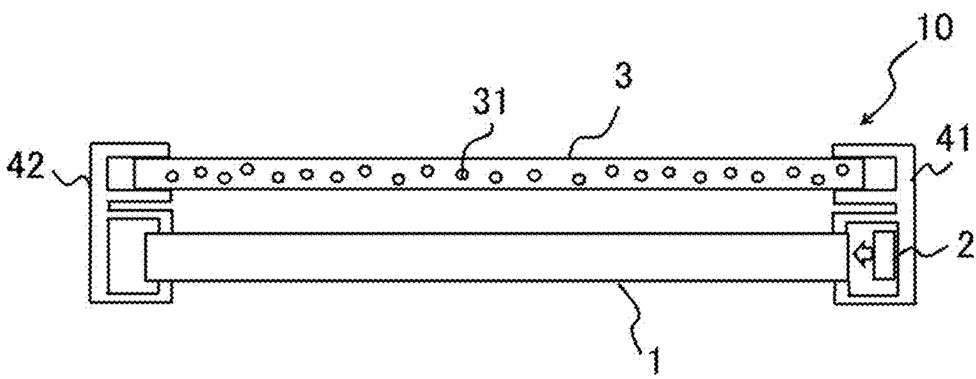
FIG. 4 illustrates a schematic lateral view of an example of a vehicle lamp.

FIG. 4 illustrates a schematic lateral view of an example of the vehicle lamp 10. The vehicle lamp 10 includes the wavelength conversion member 3 covering the plurality of light-exiting portions 1*a* of the light guide plate 1 and containing at least one kind of the phosphor 31. Both ends of the light guide plate 1 and the wavelength conversion member 3 may be supported by respective support members 41 and 42. The light source 2 may be disposed to face the lateral surface of the light guide plate 1 and may be supported by the support member 41 such that light emitted from the light source 2 enters the light guide plate 1 from the lateral surface of the light guide plate 1. The vehicle lamp 10 preferably includes the wavelength conversion member 3 that covers the light extraction sides of the plurality of light-exiting portions 1*a*. The vehicle lamp may include one wavelength conversion member that covers all of the plurality of light-exiting portions 1*a* of the light guide plate 1.

The vehicle lamp may include the wavelength conversion member that covers some of the plurality of light-exiting portions of the light guide plate. Because the vehicle lamp includes the wavelength conversion member covering the light extraction sides of the plurality of light-exiting portions, the light emitted from the light source and entered the light guide plate is diffused and exits from the light-exiting portions in the light-exiting portions of the light guide plate and further is diffused by the wavelength conversion member. Therefore, it looks like the light with reduced luminance unevenness exits over the entire regions of the light-exiting portions. In addition, by one wavelength conversion member covering all of the plurality of light-exiting portions, for example, the outline of the irradiation light on each of the light-exiting portions is blurred, and thus the light in the light extraction portion is likely to be seen fantastically.

Figure 5:
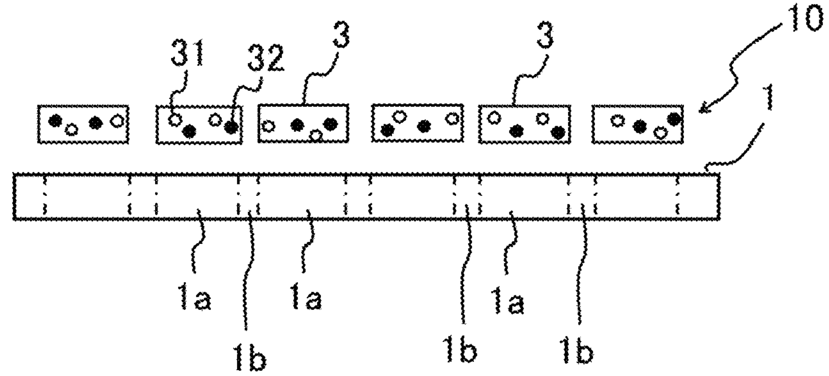
FIG. 5 illustrates a schematic lateral view of an example of a vehicle lamp.

FIG. 5 illustrates a schematic lateral view of an example of the vehicle lamp 10. The vehicle lamp 10 preferably includes a plurality of the wavelength conversion members

3 that cover the plurality of the corresponding light-exiting portions 1a on the light guide plate 1. The plurality of wavelength conversion members 3 are disposed above the light guide plate 1 while being isolated from the light guide plate 1. The wavelength conversion member 3 contains the phosphor 31 and the phosphor 32 having a composition or a light emission peak wavelength different from that of the phosphor 31. The plurality of wavelength conversion members 3 may be disposed in direct contact with the upper surface of the light guide plate 1. Because the vehicle lamp 10 includes the plurality of wavelength conversion members 3 respectively covering the light extraction side of the plurality of the corresponding light-exiting portions 1a, the light emitted from the light source 2 and entered the light guide plate 1 is diffused and exits from each of the light-exiting portions 1a and further is diffused by the wavelength conversion members 3. Therefore, it looks like the light with reduced luminance unevenness exits from the entire regions of the light-exiting portions 1a. In addition, by disposing each of the plurality of wavelength conversion members 3 above the corresponding one of the light-exiting portions 1a, for example, a difference between the luminance on the light-exiting portions 1a and the luminance of the low-luminance portions 1b can be increased, thereby improving the contrast. Furthermore, because each of the wavelength conversion members 3 is isolated, the outline of the light coming out on each of the light-exiting portions 1a is easily seen, and the design of the irradiation light in the vehicle lamp is easily improved. The outline of the light coming out on each of the light-exiting portions is easily seen, and highlighting the designed outline of the light-exiting portion allows the light in the light extraction portion to look fantastic.

A vehicle lamp according to a second aspect includes a plurality of light guide plates, a plurality of light sources, and a wavelength conversion member. The plurality of light guide plates each includes a light-exiting portion. The plurality of light sources each emits light having a light emission peak wavelength in a range from 420 nm to 550 nm that enter the corresponding one of the light guide plates. The wavelength conversion member is disposed above the light-exiting portion and emits light having a light emission peak wavelength in a range from 540 nm to 700 nm by converting a wavelength of the light exiting from the light-exiting portion.

Figure 6A:
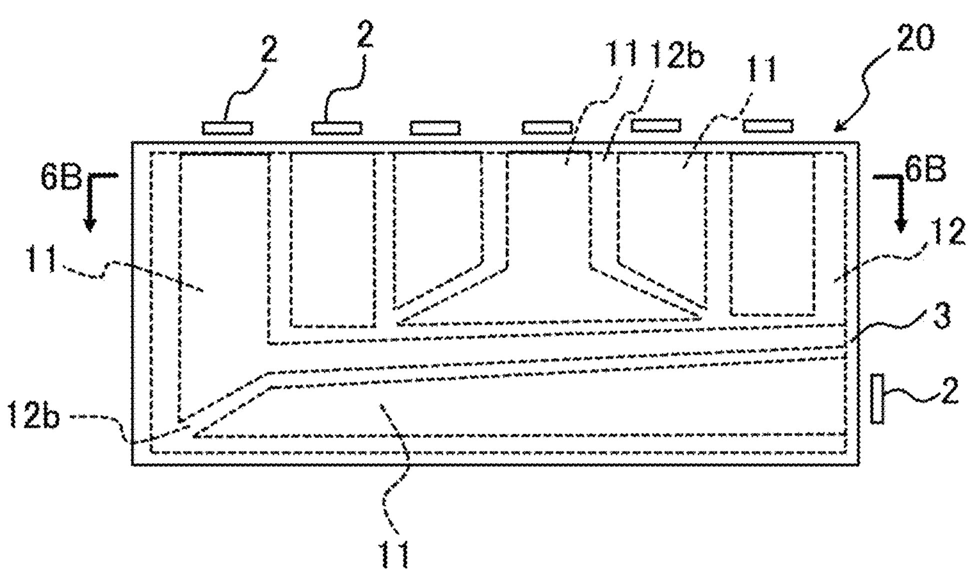
FIG. 6A is a schematic plan view illustrating an example of a vehicle lamp.
Figure 6B:
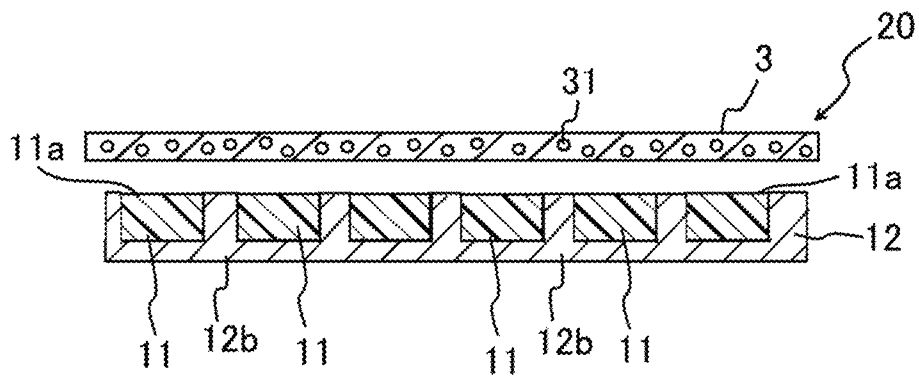
FIG. 6B is a schematic cross-sectional view of the vehicle lamp illustrated in FIG. 6A as seen along an arrow 6B direction.

FIG. 6A is a schematic plan view illustrating an example of a vehicle lamp 20 of the second aspect. FIG. 6B is a schematic cross-sectional view of the vehicle lamp 20 illustrated in FIG. 6A as seen along an arrow 6B direction. The vehicle lamp 20 includes a plurality of light guide plates 11, a plurality of light sources 2, and a wavelength conversion member 3. The plurality of light guide plates 11 each includes a light-exiting portion 11a. The plurality of light sources 2 each emits light having a light emission peak wavelength in a range from 420 nm to 550 nm that enters the corresponding one of the light guide plates 11. The wavelength conversion member 3 is disposed above the light-exiting portion 11a and emits light having a light emission peak wavelength in a range from 540 nm to 700 nm by converting a wavelength of the light exiting from the light-exiting portion 11a. The wavelength conversion member 3 contains at least one kind of the phosphor 31. The vehicle lamp 20 preferably includes one wavelength conversion member 3 that covers the plurality of light guide plates 11 to output light with reduced luminance unevenness from the entire regions of the light-exiting portions 11a. By one wavelength conversion member covering all of the plurality of light guide plates 11, for example, the outline of the irradiation light on the respective light guide plates 11 is blurred, and thus the light in the light extraction portion is likely to be seen fantastically.

Figure 7A:
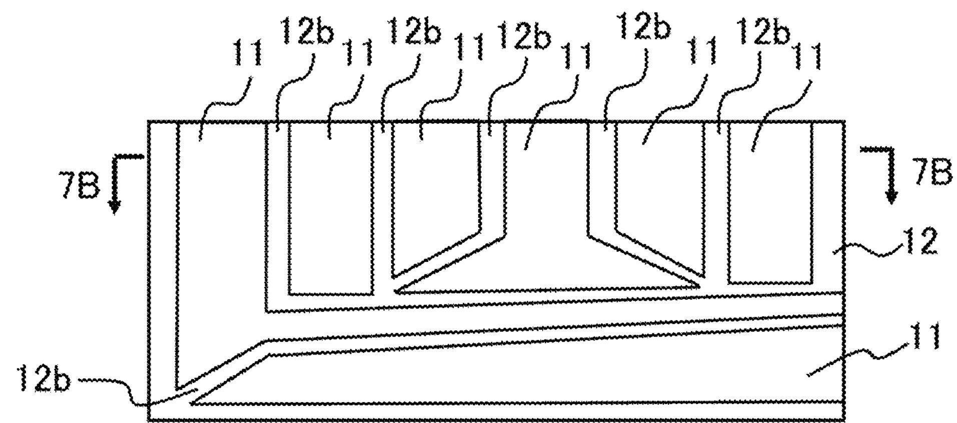
FIG. 7A is a schematic plan view illustrating an example of light guide plates provided with a vehicle lamp.
Figure 7B:
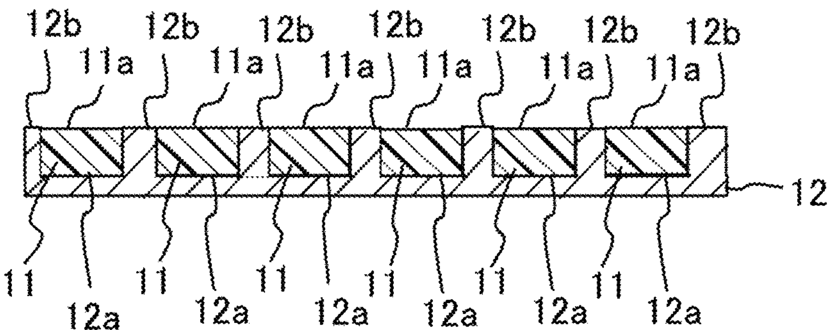
FIG. 7B is a schematic cross-sectional view of the light guide plates in FIG. 7A as seen along an arrow 7B direction.

FIG. 7A is a schematic plan view illustrating an example of a support member 12 on which the plurality of light guide plates 11 provided with the vehicle lamp of the second aspect are disposed. FIG. 7B is a schematic cross-sectional view of the light guide plates 11 in FIG. 7A as seen along an arrow 7B direction. The plurality of light guide plates 11 each including the light-exiting portion 11a are disposed on the support member 12. The support member 12 is, for example, a white member containing a light reflective material. It is preferred that the support member 12 has recessed portions 12a at positions where the corresponding light guide plates 11 are disposed and has a protrusion portion 12b between the recessed portion 12a and the recessed portion 12a in which the light guide plates 11 are disposed. It is preferred that the support member 12 also includes the protrusion portions 12b at both end portions of the support member 12. The support member 12 preferably has the recessed portions 12a in which the corresponding light guide plates 11 are disposed and the protrusion portion serving as the low-luminance portion 12b between the adjacent light guide plates 11. In the light guide plate 11, a side opposite to the side closer to the support member 12, that is, one surface of the light extraction side may be the light-exiting portions 11a. When the support member 12 has the recessed portions 12a and the light guide plates 11 are disposed in the corresponding recessed portions 12a, the lateral surfaces of the light guide plates 11 are covered with the protrusion portion serving as the low-luminance portion 12b. In the light guide plate 11 in which the lateral surface is covered with the protrusion portion serving as the low-luminance portion 12b, light is less likely to leak from the lateral surface, and the luminance of light exiting from the light-exiting portion 11a can be increased. In the vehicle lamp 20 including the plurality of light guide plates 11, when the plurality of light guide plates 11 are used as a surface light source, a region serving as the light extraction portion in which the surface light source is disposed can be partitioned into a plurality of regions by one light-exiting portion 11a of one light guide plate 11 and the low-luminance portion 12b of the support member 12. In the region serving as the light extraction portion where the vehicle lamp 20 is disposed such that the plurality of light guide plates 11 and the support member 12 serve as the surface light source, light may exit from one light-exiting portion 11a serving as one section, and lights having different colors may exit from the partitioned sections. The support member 12 only needs to be a member that can hold the plurality of light guide plates 11, and, for example, a known flat plate-shaped substrate or the like can be used. Instead of the white member, for example, as the support member 12, a member having a refractive index lower than the refractive index of the light guide plate 11 may be used. The low-luminance portion may be formed in such a manner.

The vehicle lamp preferably includes a plurality of wavelength conversion members each covering a light extraction side of the corresponding one of the plurality of light-exiting portions to output light with reduced luminance unevenness from the entire regions of the light-exiting portions 11a. Because each of the wavelength conversion members is isolated, the outline of the light coming out on each of the light-exiting portions 11a is easily seen, and the design of the irradiation light in the vehicle lamp is easily improved.

Figure 8:
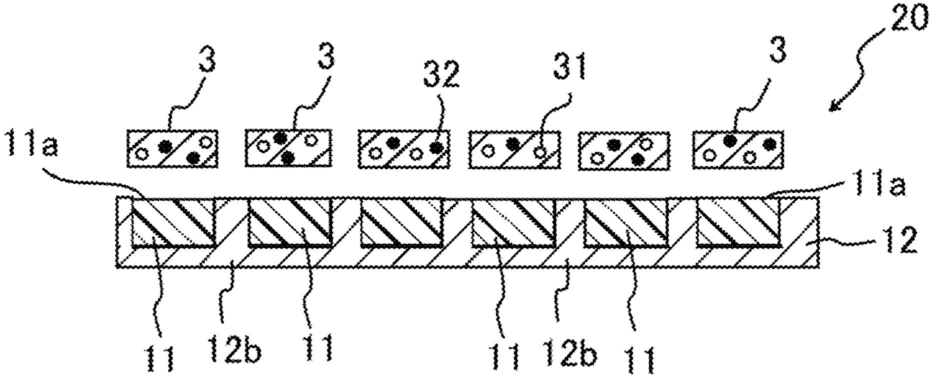
FIG. 8 is a schematic cross-sectional view of an example of a vehicle lamp.

FIG. 8 is a schematic lateral view of an example of the vehicle lamp 20. The vehicle lamp 20 includes the plurality of light guide plates 11 disposed on the support member 12 including the low-luminance portion 12*b* and the plurality of wavelength conversion members 3 each covering the light-exiting portion 11*a* of the corresponding one of the plurality of light guide plates 11. The wavelength conversion member 3 contains at least one kind of the phosphor 31.

The light guide plate according to the first aspect or the light guide plate and the support member according to the second aspect includes the light-exiting portions and the low-luminance portion. Thus, a region from which light exits is partitioned into a plurality of sections, one section is formed by one light-exiting portion, and light can exit from each section. When the region from which light exits from the vehicle lamp is partitioned into a plurality of sections and light can exit from each one of the partitioned sections, for example, animation display that outputs light such that the light sequentially flows from the right-side light-exiting portions to the left-side light-exiting portions to display meaning "Welcome" or the like, or outputs light such that the light sequentially flows from the left-side light-exiting portions to the right-side light-exiting portions to display meaning "Good Bye" or the like can be performed. By performing the animation display, the light in the light extraction portion is likely to be seen fantastically. The region from which light exits the vehicle lamp is a region serving as the light extraction portion when the vehicle lamp is mounted on a vehicle as the surface light source as described below. The region from which light exits the vehicle lamp and serving as the light extraction portion may be partitioned into a plurality of sections, and lights having different colors may exit from the partitioned sections. When a region from which light exits the vehicle lamp and serving as the light extraction portion when the vehicle lamp is mounted on a vehicle is partitioned into a plurality of sections and lights having different colors exit from the partitioned sections, the vehicle lamp can be used for, for example, a rear combination lamp that outputs white light for a backing light (back lamp), red light for both a brake light (stop) and a taillight (tail), and amber (orange) light for a direction indicator (turn signal).

The vehicle lamp preferably includes a diffusion plate disposed on the light extraction side of the wavelength conversion member and/or a diffusion plate disposed on a side opposite to the light extraction side of the wavelength conversion member. When the diffusion plate is disposed on the light extraction side of the wavelength conversion member, the light emitted from the wavelength conversion member is further diffused by the diffusion plate, and light with further reduced luminance unevenness is output. In addition, when the diffusion plate is disposed on the side opposite to the light extraction side of the wavelength conversion member, before the light exiting from the light-exiting portion enters the wavelength conversion member, the light is more diffused by the diffusion plate and enters the wavelength conversion member. The light is further diffused by the wavelength conversion member, and light with further reduced luminance unevenness is emitted. As for the diffusion plate, one diffusion plate may be disposed on any one of the light extraction side of the wavelength conversion member and the side opposite to the light extraction side of the wavelength conversion member, or two diffusion plates may be disposed on both the light extraction side of the wavelength conversion member and the side opposite to the light extraction side of the wavelength conversion member. The diffusion plate may be a diffusion layer formed in contact with the surface on the light extraction side of the wavelength conversion member and/or the surface on the side opposite to the light extraction side. The diffusion plate refers to a plate-like, sheet-like, or layer-like member containing a light-transmissive material and a light diffusing agent. The light-transmissive material includes at least one kind selected from the group consisting of a resin, glass, and an inorganic material. The resin used for the light-transmissive material is preferably at least one kind selected from the group consisting of an epoxy resin, a silicone resin, a phenol resin, and a polyimide resin. The inorganic material used for the light-transmissive material includes at least one kind selected from the group consisting of aluminum oxide and aluminum nitride. Examples of the light diffusing agent used in the diffusion plate include titanium oxide, aluminum oxide, silicon oxide, and zinc oxide.

Figure 9:
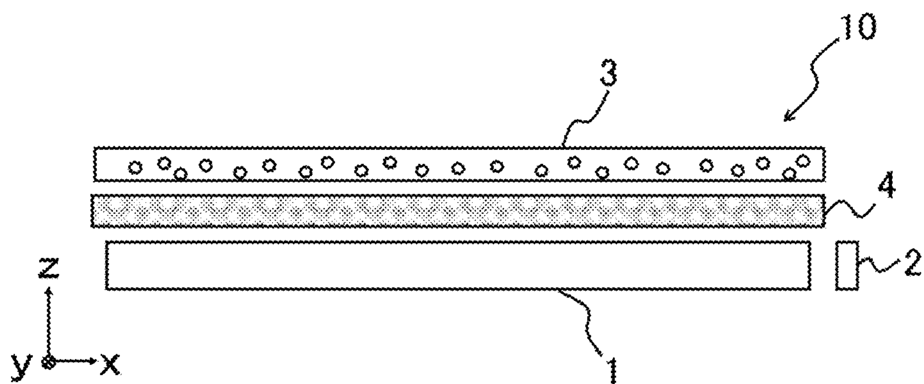
FIG. 9 is a schematic lateral view of an example of a vehicle lamp.
Figure 10:
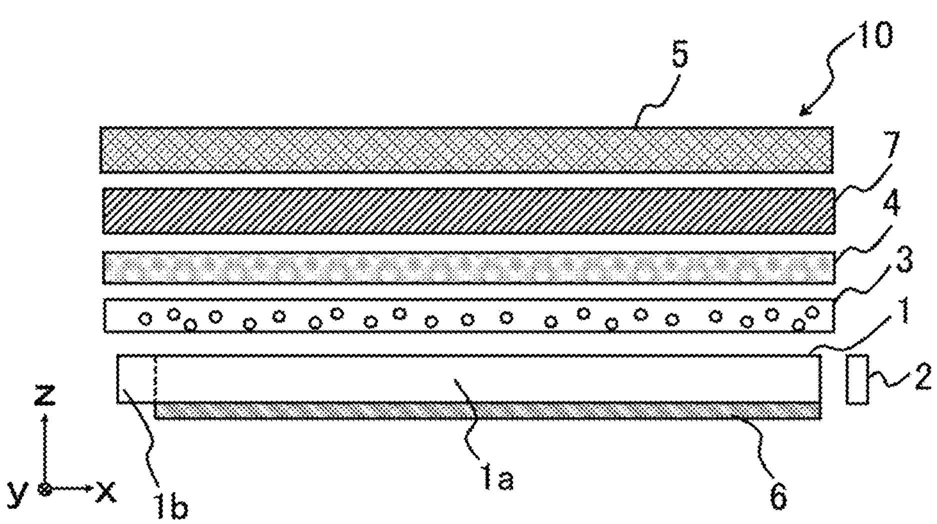
FIG. 10 is a schematic lateral view of an example of a vehicle lamp.

FIG. 9 illustrates a schematic lateral view of an example of the vehicle lamp 10. The vehicle lamp 10 includes the wavelength conversion member 3 above the light-exiting portion 1*a* of the light guide plate 1 and a diffusion plate 4 on a side opposite to the light extraction side of the wavelength conversion member 3. In FIGS. 9 and 10, the light extraction side or the light extraction direction means the +z direction in the drawings.

The vehicle lamp preferably includes a prism sheet disposed on the light extraction side of the wavelength conversion member. The prism sheet refracts lights entering from various directions in a direction toward the light extraction side, that is, in a direction perpendicular to the surface on the light exiting side of the light guide plate and the surface on the light-emitting side of the wavelength conversion member. Thus, light containing a large amount of light components in the direction perpendicular to the prism sheet exits from the surface on the light extraction side of the prism sheet, and thus the luminance of the light can be increased and luminance unevenness of one light-exiting portion can be reduced. The thickness of the prism sheet is, for example, about 0.08 μm. As the prism sheet, for example, an advanced structured optical composite (ASOC) manufactured by 3M Corporation can be used. The prism sheet may be disposed on the light extraction side of the wavelength conversion member to be spaced apart from the wavelength conversion member or to be in direct contact with the wavelength conversion member. When a diffusion plate is disposed on the light extraction side of the wavelength conversion member, the prism sheet may be spaced apart from the diffusion plate or may be disposed so as to be in direct contact with the diffusion plate.

The vehicle lamp preferably includes a reflection layer disposed on a side opposite to the light extraction side of the light-exiting portion of the light guide plate. By providing the reflection layer disposed on the side opposite to the light extraction side of the light-exiting portion of the light guide plate, the light guided by the light guide plate is reflected by the reflection layer, and the component of the light exiting from the light-exiting portion to the light extraction side is increased, and thus the luminance of the light exiting from the light-exiting portion can be increased. The reflection layer may be formed in contact with a surface on a side opposite to the light extraction side of the light-exiting portion of the light guide plate. The reflection plate can be spaced apart from the surface on the side opposite to the light extraction side of the light-exiting portion of the light guide plate. The reflection layer includes a light-transmissive material and a reflective material. The light-transmissive material used for the reflection layer is preferably a resin. The resin used for the light-transmissive material includes a curable resin mainly containing an acrylate resin, an epoxy resin, or the like. The reflective materials used for the reflection layer or the reflective plate include particles of oxides, such as titanium oxide, aluminum oxide, silicon oxide, and zinc oxide.

The vehicle lamp preferably includes a dichroic mirror disposed on the light extraction side of the wavelength conversion member. By providing the dichroic mirror on the light extraction side of the wavelength conversion member, light having a predetermined wavelength can pass through among the light exiting from the wavelength conversion member, and light in a desired color can exit from the light extraction side. The dichroic mirror is formed of a dielectric multilayer film having predetermined wavelength selectivity. The dielectric multilayer film can be formed of $Ta_2O_5/SiO_2$, $TiO_2/SiO_2$, $Nb_2O_5/SiO_2$, and the like.

The diffusion plate, the prism sheet, the reflection layer, and the dichroic mirror can be used in any combination.

FIG. 10 illustrates a schematic lateral view of an example of the vehicle lamp 10. The vehicle lamp 10 includes the wavelength conversion member 3 on the light-exiting portion 1*a* of the light guide plate 1, a reflection layer 6 on a side opposite to the light extraction side of the light-exiting portion 1*a* of the light guide plate 1, the diffusion plate 4 on the light extraction side of the wavelength conversion member, a dichroic mirror 7 on the light extraction side of the diffusion plate 4, and a prism sheet 5 on the light extraction side of the dichroic mirror 7.

The vehicle lamp preferably includes a color filter having a transmittance of 5% or less with respect to light having a wavelength in a range from 400 nm to 500 nm and a transmittance of 60% or more with respect to light having a wavelength in a range from 610 nm to 700 nm.

The vehicle lamp includes the color filter having the transmittance of 5% or less with respect to light having the wavelength in a range from 400 nm to 500 nm and having the transmittance of 60% or more with respect to light having the wavelength in a range from 610 nm to 700 nm. This can suppress transmission of light from the light source having the light emission peak wavelength in a range from 420 nm to 550 nm, the wavelength converted light by the wavelength conversion member is likely to pass through, and the outline of light coming out on the light-exiting portion can be easily seen. When the outline of the light coming out on the light-exiting portions is easily seen, the designed outline of the light-exiting portion is highlighted, and this can allow the light in the light extraction portion to look fantastic.

The color filter is preferably disposed on the light extraction side of the wavelength conversion member. The color filter can be used in combination with any of one or more members selected from the group consisting of the diffusion plate, the prism sheet, the reflection layer, and the dichroic mirror. As will be described below, a cover of the lamp body may be a color filter.

Subsequently, a procedure for measuring the luminance value of a portion facing one light-exiting portion from the light-emitting side of the wavelength conversion member (hereinafter also referred to as "luminance value Li of one light-exiting portion") and the luminance value of a portion facing the low-luminance portion (hereinafter also referred to as "luminance value Lo of the low-luminance portion") will be described. From the luminance value Li of one light-exiting portion and the luminance value Lo of the low-luminance portion, an average luminance value $Li_{ave}$ of one light-exiting portion and an average luminance value $Lo_{ave}$ of the low-luminance portion can be measured by the following procedures (a) to (j). The order of the procedures (a) to (j) can be switched, as necessary.

(a) Using a two-dimensional color luminance meter, the luminance values of the entire surface of the light guide plate or the entire surface of the support member on which the plurality of light guide plates are disposed are measured per pixel from the light extraction side of the wavelength conversion member.

(b) At a boundary between a portion (one light-exiting portion) facing one light-exiting portion and a portion (low-luminance portion) other than the portion facing the one light-exiting portion, the luminance in the vicinity of the boundary of the one light-exiting portion has the smallest value.

(c) The luminance of the smallest value in the vicinity of the boundary of the one light-exiting portion is set as a luminance value $L_B$ indicating the boundary of one light-exiting portion. To measure the plurality of light guide plates or the entire surface of the support member provided with the plurality of light guide plates, when the same light-exiting portion is measured, the value of the luminance value $L_B$ indicating the boundary is set such that the area or the number of pixels of the same light-exiting portion has the same value in the plurality of light guide plates.

(d) The luminance of a portion having the luminance value equal to or more than the set value of the luminance value $L_B$ indicating the boundary is set as the luminance value Li of one light-exiting portion.

(e) A total luminance value $Li_{total}$ of the luminance values Li of one light-exiting portion measured per pixel is calculated. The total luminance value $Li_{total}$ of the one light-exiting portion is the total value of the luminance values Li of one light-exiting portion measured per pixel.

(f) An arithmetic average value of the total luminance value $Li_{total}$ of the one light-exiting portion is calculated as the average luminance value $Li_{ave}$ of the one light-exiting portion.

(g) The luminance of a portion having a luminance value less than the set value of the luminance value $L_B$ indicating the boundary is set as the luminance value Lo of the low-luminance portion.

(h) The total luminance value $Lo_{total}$ of the luminance values Lo of the low-luminance portion measured per pixel is calculated. The total luminance value $Lo_{total}$ of the low-luminance portion is a total value of the luminance values Lo of the low-luminance portion measured per pixel.

(i) The arithmetic average value of the total luminance value $Li_{total}$ of the low-luminance portion is calculated as the average luminance value $Lo_{ave}$ of the low-luminance portion.

(j) A proportion ($Li_{ave}/Lo_{ave}\times 100(\%)$) of the average luminance value $Lo_{ave}$ of the low-luminance portion is obtained with the average luminance value $Li_{ave}$ of the one light-exiting portion as 100%.

In the present description, for example, an imaging color luminance meter (ProMetric (trade name), manufactured by Radiant Vision Systems) can be used as the two-dimensional luminance meter.

In the vehicle lamp of the present disclosure, the proportion of the average luminance value $Lo_{ave}$ of the low-luminance portion assuming the average luminance value $Li_{ave}$ of the one light-exiting portion measured from the light-emitting side of the wavelength conversion member is 100% is preferably 20% or less. In the vehicle lamp of the present disclosure, when the proportion of the average luminance value $Lo_{ave}$ of the low-luminance portion assuming the average luminance value $Li_{ave}$ of the one light-exiting portion is 100% is 20% or less, light is less likely to leak from the low-luminance portion, and the region serving as the light extraction portion when the vehicle lamp is disposed as the surface light source can be partitioned into a plurality of regions by one light-exiting portion and the low-luminance portion, and light can exit from each one of the plurality of partitioned sections. The proportion of the average luminance value $Lo_{ave}$ of the low-luminance portion assuming the average luminance value $Li_{ave}$ of the light-exiting portion is 100% only needs to be 20% or less, may be 15% or less, or may be 10% or less. The low-luminance portion need not output light, and the proportion of the average luminance value $Lo_{ave}$ of the low-luminance portion assuming the average luminance value $Li_{ave}$ of the light-exiting portion is 100% may be 0%. The proportion of the average luminance value $Lo_{ave}$ of the low-luminance portion assuming the average luminance value $Li_{ave}$ of the light-exiting portion is 100% may be 1% or more, may be 2% or more, or 5% or more.

In addition, the luminance unevenness E of the luminance of one light-exiting portion measured from the light extraction side of the wavelength conversion member can be measured by the following procedures (k) to (n). The order of the procedures (k) to (n) can be switched, as necessary.

(k) A differences $\Delta li$ between the luminance values Li of one light-exiting portion measured per pixel and the average luminance value $Li_{ave}$ of the light-exiting portion is obtained by the following Formula (I).

(l) A maximum value $\Delta li_m$ of the differences $\Delta li$ is obtained.

(m) A minimum value $\Delta li_{min}$ of the differences $\Delta li$ is obtained.

(n) From the average luminance value $Li_{ave}$ of the light-exiting portion, the maximum value $\Delta li_{max}$ of the differences $\Delta li$, and the minimum value $\Delta li_{min}$ of the differences $\Delta li$, the luminance unevenness E of the one light-exiting portion is obtained by the following Formula (II).

$$\Delta li = Li - Li_{ave} \quad \text{(I)}$$

$$E = \Delta li_{max}/Li_{ave} - \Delta Li_{min}/Li_{ave} \quad \text{(II)}$$

The luminance unevenness E of the one light-exiting portion is preferably less than 1.5. The luminance unevenness E of one light-exiting portion of less than 1.5 allows light with reduced luminance unevenness to exit from the light-exiting portion, and the light-exiting portion can be used as a surface light source with reduced luminance unevenness. The luminance unevenness E may be 1.4 or less, 1.3 or less, preferably 1.2 or less, more preferably 1.1 or less, even more preferably 1.0 or less, may be 0.1 or more, and 0.2 or more.

The number of pixels of a portion facing one light-exiting portion measured by using the above-described two-dimensional color luminance meter differs depending on the size of the light-exiting portion but is in a range from 200000 pixels (points) to 400000 pixels (points). The difference Ali in luminance and the luminance unevenness E at the portion facing one light-exiting portion measured from the light extraction side of the wavelength conversion member can be obtained in accordance with the method for measuring luminance unevenness in EIAJ ED-2810 Measuring methods for Organic EL display modules defined by the Japan Electronics and Information Technology Industries Association.

The vehicle lamp includes the lamp body including the light extraction portion and a cover disposed at the light extraction portion. The vehicle lamp preferably emits light to pass through the cover and outputs light in a region R. The region R is defined by a first R straight line connecting a first R point and a second R point, a second R straight line connecting the second R point and a third R point, a third R straight line connecting the third R point and a fourth R point, and a fourth R straight line connecting the fourth R point and the first R point when, in xy chromaticity coordinates of the CIE1931 chromaticity diagram, chromaticity coordinates (x, y) where (x=0.645, y=0.335) are assumed as the first R point, chromaticity coordinates (x, y) where (x=0.665, y=0.335) are assumed as the second R point, chromaticity coordinates (x, y) where (x=0.735, y=0.265) are assumed as the third R point, and chromaticity coordinates (x, y) where (x=0.721, y=0.259) are assumed as the fourth R point. When the vehicle lamp includes the lamp body and the cover, and the light passing through and exiting from the cover is light having a color in the region R in the xy chromaticity coordinates of the CIE1931 chromaticity diagram, for example, red light that is used for both a brake light (stop) and a taillight (tail) can be output. The light having the color in the region R in the xy chromaticity coordinates of the CIE1931 chromaticity diagram may exit from at least one light-exiting portion of the vehicle lamp.

In outputting the light in the region R in the xy chromaticity coordinates in the CIE1931 chromaticity diagram, from at least one light-exiting portion of the vehicle lamp passing through the cover, the vehicle lamp preferably includes at least one light source that emits light having a light emission peak wavelength in a range from 420 nm to 470 nm. The above-described light-emitting element can be used as a such light source that emits light having a light emission peak wavelength in a range from 420 nm to 470 nm can be used.

The vehicle lamp includes the lamp body including the light extraction portion and the cover disposed at the light extraction portion. The vehicle lamp preferably emits the light to pass through the cover and outputs light in a region A. The region A is defined by a first A straight line connecting a first A point and a second A point, a second A straight line connecting the second A point and a third A point, a third A straight line connecting the third A point and a fourth A point, and a fourth A straight line connecting the fourth A point and the first A point when, in xy chromaticity coordinates of the CIE1931 chromaticity diagram, chromaticity coordinates (x, y) where (x=0.545, y=0.425) are assumed as the first A point, chromaticity coordinates (x, y) where (x=0.557, y=0.442) are assumed as the second A point, chromaticity coordinates (x, y) where (x=0.609, y=0.390) are assumed as the third A point, and chromaticity coordinates (x, y) where (x=0.597, y=0.390) are assumed as the fourth A point. When the vehicle lamp includes the lamp body and the cover, and the light passing through and exiting from the cover is light having a color in the region A in the xy chromaticity coordinates of the CIE1931 chromaticity diagram, for example, orange light that is used for the of a direction indicator lamp can be output. The light having the color in the region A in the xy chromaticity coordinates of the CIE1931 chromaticity diagram may exit from at least one light-exiting portion of the vehicle lamp.

In outputting the light in the region A in the xy chromaticity coordinates of the CIE1931 chromaticity diagram from at least one light-exiting portion of the vehicle lamp passing through the cover, the vehicle lamp preferably includes at least one light source that emits light having a light emission peak wavelength in a range from 500 nm to 550 nm. The above-described light-emitting element can be used as such a light source that emits light having a light emission peak wavelength in a range from 500 nm to 550 nm can be used.

The vehicle lamp includes the lamp body including the light extraction portion and the cover disposed at the light extraction portion. The vehicle lamp preferably emits the light to pass through the cover and outputs light in a region W. The region W is defined by a first W straight line connecting a first W point and a second W point, a second W straight line connecting the second W point and a third W point, a third W straight line connecting the third W point and a fourth W point, a fourth W straight line connecting the fourth W point and a fifth W point, a fifth W straight line connecting the fifth W point and a sixth W point, and a sixth W straight line connecting the sixth W point and the first W point when, in xy chromaticity coordinates of the CIE1931 chromaticity diagram, chromaticity coordinates (x, y) where (x=0.310, y=0.348) are assumed as the first W point, chromaticity coordinates (x, y) where (x=0.453, y=0.440) are assumed as the second W point, chromaticity coordinates (x, y) where (x=0.500, y=0.440) are assumed as the third W point, chromaticity coordinates (x, y) where (x=0.500, y=0.382) are assumed as the fourth W point, chromaticity coordinates (x, y) where (x=0.443, y=0.382) are assumed as the fifth W point, and chromaticity coordinates (x, y) where (x=0.310, y=0.283) are assumed as the sixth W point. When the vehicle lamp includes the lamp body and the cover, and the light passing through and exiting from the cover is light having a color in the region W in the xy chromaticity coordinates of the CIE1931 chromaticity diagram, for example, white light that is used for a backing light lamp can be output. The light having the color in the region W in the xy chromaticity coordinates of the CIE1931 chromaticity diagram may exit from at least one light-exiting portion of the vehicle lamp.

In outputting the light in the region W in xy chromaticity coordinates in the CIE1931 chromaticity diagram from at least one light-exiting portion of the vehicle lamp passing through the cover, the vehicle lamp preferably includes at least one light source that emits light having a light emission peak wavelength in a range from 470 nm to 500 nm. The above-described light-emitting element can be used as such a light source that emits light having a light emission peak wavelength in a range from 470 nm to 500 nm can be used.

Figure 11:
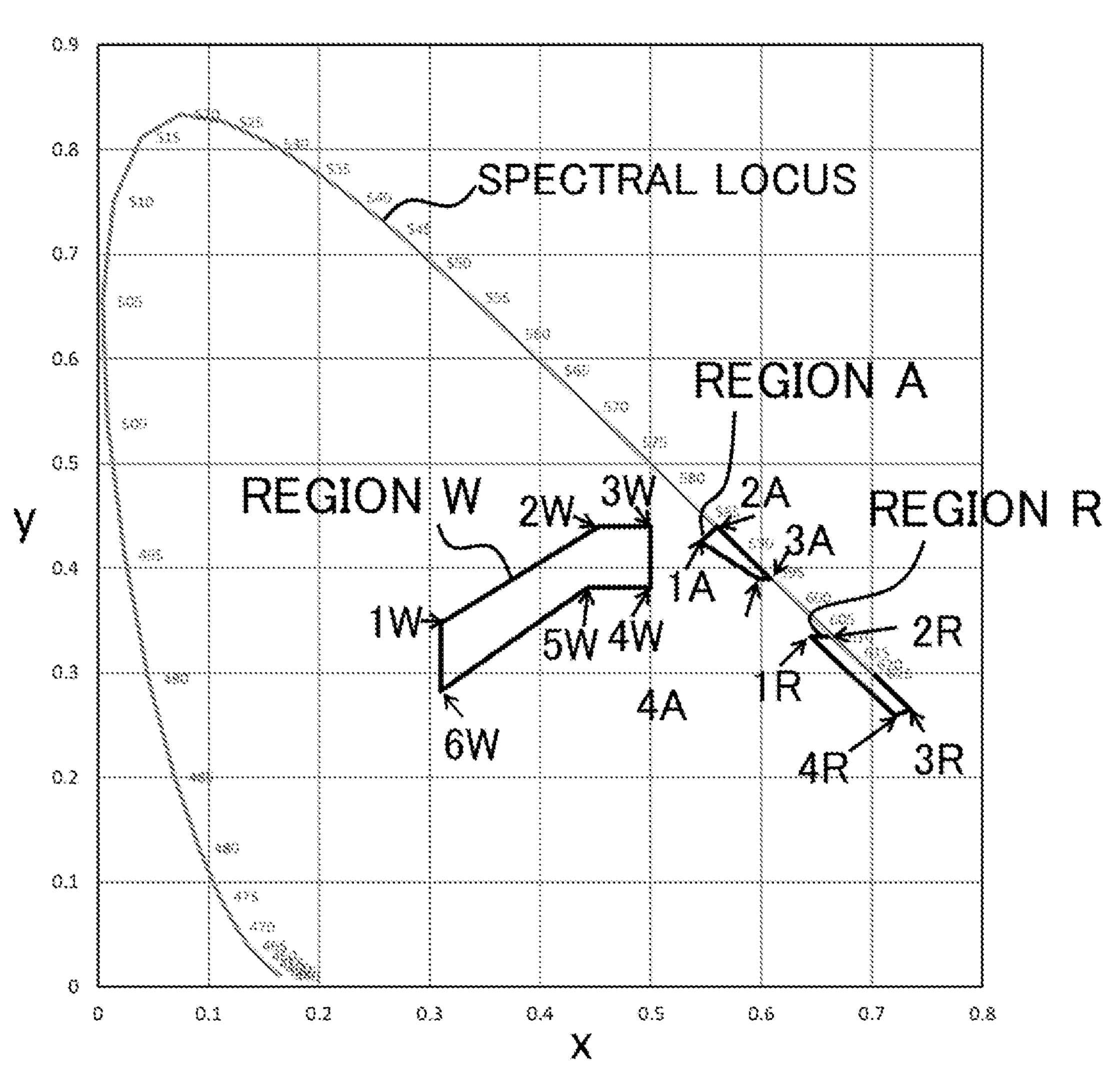
FIG. 11 is a diagram illustrating a region R, a region A, and a region W in xy chromaticity coordinates of the CIE1931 chromaticity diagram.

FIG. 11 is a diagram illustrating the region R, the region A, and the region W of the light output by the vehicle lamp in xy chromaticity coordinates of the CIE1931 chromaticity diagram. In FIG. 11, a line drawing an arc is a spectral locus, and values in the vicinity of the spectral locus indicate wavelengths. Hereinafter, the "CIE1931 chromaticity diagram" may be referred to as "chromaticity diagram" and the "chromaticity coordinates of the CIE1931 chromaticity diagram" may be referred to as "chromaticity coordinates". Light in the region R in the chromaticity diagram exhibits a red emission color. Light in the region Ain the chromaticity diagram exhibits an orange emission color. Light in the region W in the chromaticity diagram exhibits a white emission color. The light in the region R, the light in the region A, and the light in the region W in the chromaticity diagram may exit from parts of respective different partitioned regions in the region serving as the light extraction portion of the vehicle lamp. Red light in the region R in the chromaticity diagram may exits from one light-exiting portion, orange light in the region A in the chromaticity diagram may exits from another light-exiting portion, and white light in the region W in the chromaticity diagram may exit from a light-exiting portion different from the light-exiting portions outputting red light and orange light.

In the chromaticity diagram, light in a color in the region R, the region A, and the region W respectively conforms to colors of red of a brake light or a taillight, orange of a direction indicator lamp, and white of a backing light, of an Economic Commission for Europe (ECE) standard, which is a testing standard for automobiles established by the Economic Commission for Europe. In the chromaticity diagram, light in a color in the region W has chromaticity coordinates in a white region defined by JIS D5500. In the chromaticity diagram, light in a color in the region A satisfies the range $0.429 \geq y \geq 0.398$ and $z \leq 0.007$ in the chromaticity coordinates defined in JIS Z8701. The light in a color in the region R satisfies the range $y \leq 0.335$ and $z \leq 0.008$ in the chromaticity coordinates defined in JIS Z8701. The light color of light reflected by the irradiation surface of the cover of the vehicle lamp is preferably in the same chromaticity range as the chromaticity range of the region R.

Figure 12:
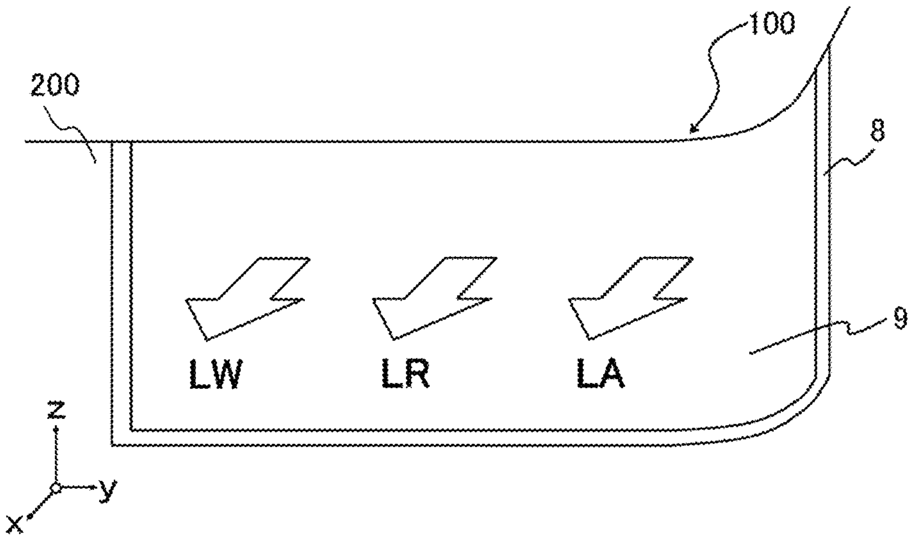
FIG. 12 is an external view schematically illustrating a state in which a vehicle lamp is attached to a vehicle body.
Figure 13:
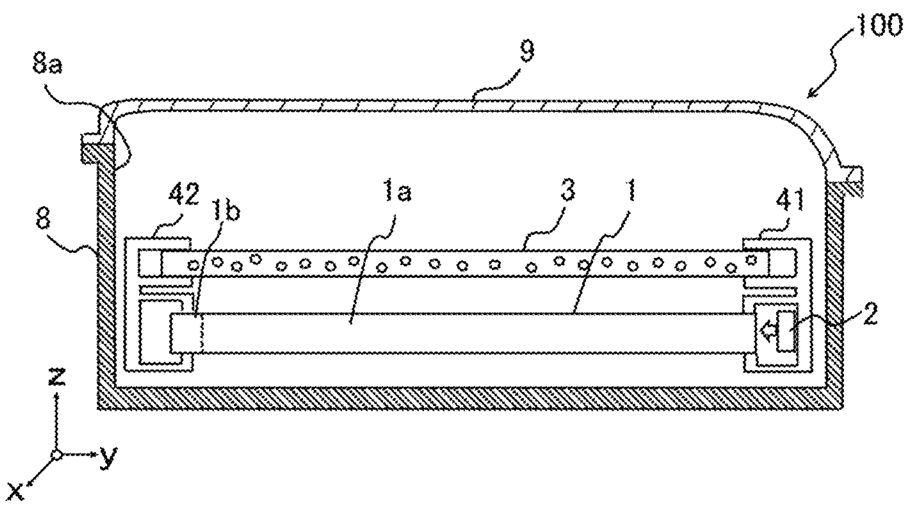
FIG. 13 is a cross-sectional view schematically illustrating a vehicle lamp.

An example of the vehicle lamp including a lamp body and a cover will be described with reference to the drawings. FIG. 12 is an external view schematically illustrating a state in which a vehicle lamp 100 including a lamp body and a cover is attached to a vehicle body 200. FIG. 13 is a cross-sectional view schematically illustrating the vehicle lamp 100. In the cross-sectional view of FIG. 13, unless otherwise specified, the +Z direction may be described as an upper or upward direction and the −Z direction may be described as a lower or downward direction. In FIG. 13, the upper side or the upward direction indicates the light extraction side or the light extraction direction.

The vehicle lamp 100 described with reference to FIGS. 12 and 13 includes a lamp body 8 and a cover 9 on a light extraction portion 8*a* as an opening portion of the lamp body 8. In the lamp body 8, the light guide plate 1 and the wavelength conversion member 3 supported at the both ends by the respective support members 41 and 42 may be disposed. The cover 9 may be a color filter. The light exiting from one light-exiting portion 1*a* of the vehicle lamp 100 is wavelength-converted by at least the wavelength conversion member 3 and passes through the cover 9. The light that has passed through the cover 9 preferably exhibits a color in the region R in the chromaticity diagram illustrated in FIG. 11, for example. The color filter preferably has a transmittance of 5% or less with respect to light at a wavelength in a range from 400 nm to 500 nm and a transmittance of 60% or more with respect to light at a wavelength in a range from 610 nm to 700 nm.

A set of two bilaterally symmetrical vehicle lamps are used at the rear of the vehicle body. The vehicle lamp may be embedded in and attached to a vehicle body such that the cover of the vehicle lamp serving as the exiting surface of light from the vehicle lamp and serving as a reflection surface of light from the outside is exposed on a rear surface of the vehicle body so as to be easily seen in a vehicle width direction of a vehicle to which the vehicle lamp is attached. The vehicle lamp preferably outputs white light LW, red light LR, and orange light LA from the exiting surface of the cover according to respective region. The vehicle lamp preferably reflects red light from the cover covering the entire irradiation surface by the light from the outside. In the present description, orange includes amber. It is preferable that the white light LW being backing light of a vehicle, the orange light LA being a direction indicator lamp, and the red light LR being a brake light and a taillight satisfy the emission colors in the chromaticity range in the region W, the region R, and the region A, respectively, in the chromaticity diagram, and satisfy the colors of white light for backing light, orange light of direction indicator lamp, and red light of brake light lamp or taillight, respectively, of the ECE standard.

The cover may function as a color filter or may function as an outer lens. The cover may be provided to give a function as a reflector to at least a part of the irradiation surface of the vehicle lamp, and may have a function as a reflector that reflects red light when light is incident on the cover from the outside. When the cover functions as a color filter, a transmittance is preferably 5% or less with respect to light at a wavelength in a range from 400 nm to 500 nm and a transmittance is preferably 60% or more with respect to light at a wavelength in a range from 610 nm to 700 nm.

When the cover also functions as a color filter, a filter colored with a red pigment such as an azo compound, a cyanine compound, a perylene compound, or a dioxazine compound and formed of a transparent resin having a necessary strength such as an acrylic resin or a polycarbonate resin can be used. The cover also has a function of an outer lens, also referred to as an outer lens. The cover may have a lens function or may have no lens function and allow light to pass therethrough as its light distribution is. The cover may be formed, on the back surface (inner surface) or the surface thereof, with protrusions and recessions (lens cuts, microprisms) such that at least a partial region serves as a retroreflector.

The lamp body is a housing with the open light extraction portion serving as an irradiation surface and constitutes an exterior of the vehicle lamp. The lamp body accommodates the light guide plate, the wavelength conversion member, and the light source. The cover is disposed so as to cover the opening serving as the light extraction portion and is supported by the lamp body. The lamp body is preferably a light reflector having an inner surface serving as a reflective surface. In the vehicle lamp including such a lamp body, the emission light that has passed through the wavelength conversion member or the like is output from at least one light-exiting portion to the cover, and the white light LW, the orange light LA, and the red light LR that have passed through the cover from the light extraction portion are output from the rear of the vehicle. The vehicle lamp can output light from each of the partitioned regions in the light extraction portion, can output, after the light passing through the cover, the light in each of the colors of white, red, and orange defined by ECE, and can be used as a rear combination lamp of a vehicle body. In addition, because the vehicle lamp can output light from each of the plurality of partitioned sections in the light extraction portion, animation display that allows light to turn on such that the light has specific meaning for each section can be performed.

Certain embodiments of the present disclosure include vehicle lamp described below.

Aspect 1

A vehicle lamp, comprising:

a light guide plate comprising:

a plurality of light-exiting portions, and a low-luminance portion that is located between adjacent light-exiting portions of the plurality of light-exiting portions, and is configured to output light having luminance lower than luminance of light exiting from the light-exiting portions;

a plurality of light sources individually configured to emit light having a light emission peak wavelength in a range from 420 nm to 550 nm to enter the light guide plate; and at least one wavelength conversion member disposed above the plurality of light-exiting portions and configured to emit light having a light emission peak wavelength in a range from 540 nm to 700 nm by converting a wavelength of the light exiting from the plurality of light-exiting portions.

Aspect 2

A vehicle lamp, comprising:

a plurality of light guide plates each comprising a light-exiting portion;

a plurality of light sources individually configured to emit light having a light emission peak wavelength in a range from 420 nm to 550 nm to enter a corresponding one of the plurality of light guide plates; and at least one wavelength conversion member disposed above at least one of the light-exiting portions and configured to emit light having a light emission peak wavelength in a range from 540 nm to 700 nm by converting a wavelength of light exiting from the light-exiting portions.

Aspect 3

The vehicle lamp according to Aspect 2, further comprising a support member on which the plurality of light guide plates are disposed, wherein the support member comprises a low-luminance portion located between two of the plurality of light guide plates.

Aspect 4

The vehicle lamp according to Aspect 1 or 3, wherein when luminance values of a portion of the wavelength conversion member facing one of the plurality of light-exiting portions are measured per pixel from a light extraction side of the wavelength conversion member by using a two-dimensional color luminance meter, and assuming an average luminance value $Li_{ave}$ of the one light-exiting portion as an arithmetic average value of a total luminance value of the luminance values measured per pixel is 100%, a proportion of an average luminance value $Lo_{ave}$ of the low-luminance portion as an arithmetic average value of a total luminance value of luminance values of a portion of the wavelength conversion member facing the low-luminance portion measured per pixel from the light extraction side of the wavelength conversion member is 20% or less.

Aspect 5

The vehicle lamp according to any one of Aspects 1 to 4, wherein the wavelength conversion member covers a light extraction side of the plurality of light-exiting portions.

Aspect 6

The vehicle lamp according to any one of Aspects 1 to 4, wherein a plurality of the wavelength conversion members each cover a light extraction side of a corresponding one of the plurality of light-exiting portions.

Aspect 7

The vehicle lamp according to any one of Aspects 1 to 6, wherein luminance values of a portion of the wavelength conversion member facing one of the plurality of light-exiting portions are measured per pixel by using a two-dimensional color luminance meter, an average luminance value $Li_{ave}$ of the one light-exiting portion as an arithmetic average value of a total luminance value of luminance values Li of the one light-exiting portion measured per pixel and differences Δli between the luminance values Li and the average luminance value $Li_{ave}$ are obtained from the following Formula (I), and a luminance unevenness E obtained by the following Formula (II) with a maximum value $\Delta li_{max}$ of the differences Δli, a minimum value $\Delta li_{min}$ of the differences Δli, and the average luminance value $Li_{ave}$ is less than 1.5.

$$\Delta li = Li - Li_{ave} \quad \text{(I)}$$

$$E = \Delta Li_{max}/Li_{ave} - \Delta li_{min}/Li_{ave} \quad \text{(II)}$$

Aspect 8

The vehicle lamp according to any one of Aspects 1 to 7, further comprising:

a diffusion plate disposed on a light extraction side of the wavelength conversion member; and/or a diffusion plate disposed on a side opposite to the light extraction side of the wavelength conversion member.

Aspect 9

The vehicle lamp according to any one of Aspects 1 to 8, further comprising a prism sheet disposed on a light extraction side of the wavelength conversion member.

Aspect 10

The vehicle lamp according to any one of Aspects 1 to 9, further comprising a reflection layer disposed on a side opposite to a light extraction side of one of the plurality of light-exiting portions.

Aspect 11

The vehicle lamp according to any one of Aspects 1 to 10, further comprising a dichroic mirror disposed on a side opposite to a light extraction side of one of the plurality of light-exiting portions.

Aspect 12

The vehicle lamp according to any one of Aspects 1 to 11, wherein a thickness of the wavelength conversion member is in a range from 18 μm to 100 μm.

Aspect 13

The vehicle lamp according to any one of Aspects 1 to 12, wherein the wavelength conversion member contains at least one kind of phosphor selected from the group consisting of a rare-earth-aluminate phosphor having a composition represented by the following Formula (1), a first nitride phosphor having a composition represented by the following Formula (2), a second nitride phosphor having a composition represented by the following Formula (3), a third nitride phosphor having a composition represented by the following Formula (4), a fourth nitride phosphor having a composition represented by the following Formula (5), a fifth nitride phosphor having a composition represented by the following Formula (6), a first fluoride phosphor having a composition represented by the following Formula (7), and a second fluoride phosphor having a composition represented by the following Formula (8),

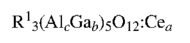

$$R^1_3(Al_cGa_b)_5O_{12}:Ce_a \quad (1)$$

wherein in Formula (1), $R^1$ is at least one kind selected from the group consisting of Y, Gd, Lu and Tb, and a, b, and c satisfy $0<a\leq0.22$, $0\leq b\leq0.4$, $0<c\leq1.1$, and $0.9\leq b+c\leq1.1$,

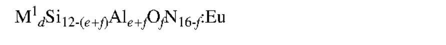

$$M^1_dSi_{12-(e+f)}Al_{e+f}O_fN_{16-f}:Eu \quad (2)$$

wherein in Formula (2), $M^1$ contains at least one kind of element selected from the group consisting of Li, Mg, Ca, Sr, Y, and lanthanoid elements, excluding La and Ce, and d, e, and f satisfy $0<d\leq2.0$, $2.0\leq e\leq6.0$, and $0\leq f\leq1.0$, respectively,

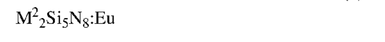

$$M^2_2Si_5N_8:Eu \quad (3)$$

wherein in Formula (3), $M^2$ is an alkaline earth metal element containing at least one kind selected from the group consisting of Ca, Sr, and Ba,

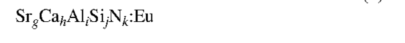

$$Sr_gCa_hAl_iSi_jN_k:Eu \quad (4)$$

wherein in Formula (4), g, h, i, j, and k satisfy $0\leq g<1$, $0<h\leq1$, $g+h\leq1$, $0.9\leq i\leq1.1$, $0.9\leq j\leq1.1$, and $2.5\leq k\leq3.5$,

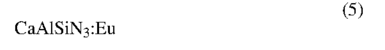

$$CaAlSiN_3:Eu \quad (5)$$

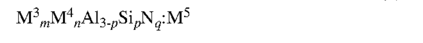

$$M^3_mM^4_nAl_{3-p}Si_pN_q:M^5 \quad (6)$$

wherein in Formula (6), $M^3$ is at least one kind of element selected from the group consisting of Ca, Sr, Ba, and Mg, $M^4$ is at least one kind of element selected from the group consisting of Li, Na, and K, $M^5$ is at least one kind of element selected from the group consisting of Eu, Ce, Tb, and Mn, and m, n, p, and q satisfy $0.80\leq m\leq1.05$, $0.80\leq n\leq1.05$, $0\leq p\leq0.5$, and $3.0\leq q\leq5.0$, respectively,

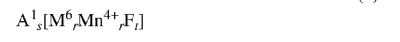

$$A^1_s[M^6_rMn^{4+}_rF_t] \quad (7)$$

wherein in Formula (7), $A^1$ is at least one kind of ion selected from the group consisting of $K^+$, $Li^+$, $Na^+$, $Rb^+$, $Cs^+$, and $NH_4^+$, $M^6$ is at least one kind of element selected from the group consisting of Group 4 elements and Group 14 elements, r satisfies $0<r<0.2$, s is an absolute value of electric charge of $[M^6_{1-r}Mn^{4+}_rF_t]$ ion, and t satisfies $5<t<7$,

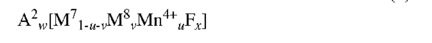

$$A^2_w[M^7_{1-u-v}M^8_vMn^{4+}_uF_x] \quad (8)$$

wherein in Formula (8), $A^2$ is at least one kind of ion selected from the group consisting of $K^+$, $Li^+$, $Na^+$, $Rb^+$, $Cs^+$, and $NH_4^+$, $M^7$ is at least one kind of element selected from the group consisting of Group 4 and Group 14, $M^8$ is at least one kind of element selected from the group consisting of Group 13, u satisfies $0<u<0.2$, w is an absolute value of electric charge of $[M^7_{1-u-v}M^8_vMn^{4+}_uF_x]$ ion, v satisfies $0<v\leq0.1$, and x satisfies $5<x<7$.

Aspect 14

The vehicle lamp according to any one of Aspects 1 to 13, further comprising:

a lamp body comprising a light extraction portion; and a cover disposed at the light extraction portion, wherein the vehicle lamp emits light to pass through the cover and outputs light in a region R, the region R being defined by a first R straight line connecting a first R point and a second R point, a second R straight line connecting the second R point and a third R point, a third R straight line connecting the third R point and a fourth R point, and a fourth R straight line connecting the fourth R point and the first R point, wherein in a CIE1931 chromaticity diagram, the first R point has chromaticity coordinates (x=0.645, y=0.335), the second R point has chromaticity coordinates (x=0.665, y=0.335), the third R point has chromaticity coordinates (x=0.735, y=0.265), and the fourth R point has chromaticity coordinates (x=0.721, y=0.259).

Aspect 15

The vehicle lamp according to Aspect 14, wherein at least one of the plurality of light sources emits light having a light emission peak wavelength in a range from 420 nm to 470 nm.

Aspect 16

The vehicle lamp according to any one of Aspects 1 to 15, further comprising:

a lamp body comprising a light extraction portion; and a cover disposed at the light extraction portion, wherein the vehicle lamp emits light to pass through the cover and outputs light in a region A, the region A being defined by a first A straight line connecting a first A point and a second A point, a second A straight line connecting the second A point and a third A point, a third A straight line connecting the third A point and a fourth A point, and a fourth A straight line connecting the fourth A point and the first A point, wherein in a CIE1931 chromaticity diagram, the first A point has chromaticity coordinates (x=0.545, y=0.425), the second A point has chromaticity coordinates (x=0.557, y=0.442), wherein the third A point has chromaticity coordinates (x=0.609, y=0.390), and the fourth A point has chromaticity coordinates (x=0.597, y=0.390).

Aspect 17

The vehicle lamp according to Aspect 16, wherein at least one of the plurality of light sources emits light having a light emission peak wavelength in a range from 500 nm to 550 nm.

Aspect 18

The vehicle lamp according to any one of Aspects 1 to 17, further comprising:

a lamp body comprising a light extraction portion; and a cover disposed at the light extraction portion, wherein the vehicle lamp emits light to pass through the cover and outputs light in a region W, the region W being defined by a first W straight line connecting a first W point and a second W point, a second W straight line connecting the second W point and a third W point, a third W straight line connecting the third W point and a fourth W point, a fourth W straight line connecting the fourth W point and a fifth W point, a fifth W straight line connecting the fifth W point and a sixth W point, and a sixth W straight line connecting the sixth W point and the first W point, wherein in a CIE1931 chromaticity diagram, the first W point has chromaticity coordinates (x=0.310, y=0.348), the second W point has chromaticity coordinates (x=0.453, y=0.440), the third W point has chromaticity coordinates (x=0.500, y=0.440), the fourth W point has chromaticity coordinates (x=0.500, y=0.382), the fifth W point has chromaticity coordinates (x=0.443, y=0.382), and the sixth W point has chromaticity coordinates (x=0.310, y=0.283).

Aspect 19

The vehicle lamp according to Aspect 18, wherein at least one of the plurality of light sources emits light having a light emission peak wavelength in a range from 470 nm to 500 nm.

Aspect 20

The vehicle lamp according to Aspect 13, wherein a volume average particle diameter of the phosphor is in a range from 5 μm to 35 μm.

Aspect 21

The vehicle lamp according to Aspect 13 or 20, wherein an amount of a phosphor per volume of the wavelength conversion member represented by a product of a thickness of the wavelength conversion member having equal area and a content (parts by mass) of the phosphor in the wavelength conversion member per 100 parts by mass of a light-transmissive material in the wavelength conversion member is in a range from 2000 parts by mass to 14000 parts by mass.

Aspect 22

The vehicle lamp according to any one of Aspects 1 to 21, further comprising a color filter having a transmittance that is 5% or less with respect to light having a wavelength in a range from 400 nm to 500 nm and a transmittance that is 60% or more with respect to light having a wavelength in a range from 610 nm to 700 nm.

EXAMPLES

The present disclosure will be described in further detail hereinafter using examples. However, the present disclosure is not limited to these examples.

Example 1

A light guide plate 1 formed of polymethyl methacrylate resin (PMMA) and including a plurality of light-exiting portions 1_a_ and a low-luminance portion 1_b_ illustrated in FIGS. 3A and 3B was provided. A semiconductor light-emitting element using a nitride semiconductor that emits light having a light emission peak wavelength of 450 nm was provided as a light source. A wavelength conversion member containing a CASN phosphor having the composition represented by Formula (5) above and a silicone resin was provided. The thickness of the wavelength conversion member was 60 μm. The vehicle lamp 10 that includes the light guide plate 1 including the plurality of light-exiting portions 1_a_ and the low-luminance portion 1_b_ located between the adjacent light-exiting portions 1_a_ illustrated in FIG. 1A was formed. The light guide plate 1 is provided with light sources 2 that each emits light having the light emission peak wavelength of 450 nm and a wavelength conversion member 3 disposed above the light-exiting portions 1_a_ to cover the light-exiting portions 1_a_ and convert the wavelength of light exiting from each of the light-exiting portions 1_a_ to emit light having the light emission peak wavelength of 660 nm. By using a device measuring the luminance described below, the chromaticity coordinates (x, y) in the CIE chromaticity diagram of the light exiting from one light-exiting portion 1*a* of the vehicle lamp 10 according to Example 1 were measured per pixel from the light extraction side of the wavelength conversion member 3. The arithmetic average value of the chromaticity coordinates (x, y) measured per pixel was obtained. The chromaticity coordinates (average value) of light exiting from one light-exiting portion 1*a* measured from the light extraction side of the wavelength conversion member 3 of the vehicle lamp 10 according to Example 1 was (x=0.695, y=0.305), and the light in the region R in the CIE chromaticity diagram illustrated in FIG. 11 was output.

Example 2

A light guide plate 1 formed of polymethyl methacrylate resin (PMMA) and including a plurality of light-exiting portions 1*a* and a low-luminance portion 1*b* illustrated in FIGS. 3A and 3B was provided. A semiconductor light-emitting element using a nitride semiconductor that emits light having a light emission peak wavelength of 450 nm was provided as a light source. A wavelength conversion member containing a CASN phosphor having the composition represented by Formula (5) above and a silicone resin was provided. The thickness of the wavelength conversion member was 60 μm. The vehicle lamp 10 that includes the light guide plate 1 including the plurality of light-exiting portions 1*a* and the low-luminance portion 1*b* located between the adjacent light-exiting portions 1*a* illustrated in FIG. 9 was formed. The light guide plate 1 is provided with light sources 2 that each emits light having the light emission peak wavelength of 450 nm, a wavelength conversion member 3 disposed above the light-exiting portions 1*a* to cover the light-exiting portions 1*a* and converting the wavelength of light exiting from each of the light-exiting portions 1*a* to emit light having the light emission peak wavelength of 660 nm, and a diffusion plate 4 disposed on a side opposite to the light extraction side of the wavelength conversion member 3. Similarly to Example 1, the average value of the chromaticity coordinates (x, y) in the CIE chromaticity diagram of light exiting from one light-exiting portion 1*a* of the vehicle lamp 10 according to Example 2 was measured. The chromaticity coordinates (average value) of light exiting from one light-exiting portion 1*a* measured from the light extraction side of the wavelength conversion member 3 of the vehicle lamp 10 according to Example 2 was (x=0.696, y=0.304), and the light in the region R in the CIE chromaticity diagram illustrated in FIG. 11 was output.

Comparative Example 1

A light guide plate formed of polymethyl methacrylate resin (PMMA) and including a plurality of light-exiting portions and a low-luminance portion was provided. A semiconductor light-emitting element that emits light having a light emission peak wavelength of 630 nm was provided as a light source. The vehicle lamp that includes the light guide plate including the plurality of light-exiting portions and the low-luminance portion located between the adjacent light-exiting portions was formed. The light guide plate is provided with light sources emitting light having the light emission peak wavelength of 630 nm to so that the emitted light enters the light guide plate, and a diffusion plate disposed above the light-exiting portions to cover the light-exiting portions. Comparative Example 1 differs from Example 1 and Example 2 in that the light sources that each emits light having the light emission peak wavelength of 630 nm are used instead of the wavelength conversion member that emits light having the light emission peak wavelength of 660 nm. Similarly to Example 1, the average value of the chromaticity coordinates (x, y) in the CIE chromaticity diagram of light exiting from one light-exiting portion of the vehicle lamp according to Comparative Example 1 was measured. The chromaticity coordinates (average values) of light exiting from one light-exiting portion measured from the light extraction side of the diffusion plate of the vehicle lamp according to Comparative Example 1 was (x=0.686, y=0.314), and the light in the region R in the CIE chromaticity diagram illustrated in FIG. 11 was output.

Measurement of Luminance Value and Luminance Unevenness

The light was output from one light-exiting portion of each of the vehicle lamps of Example 1, Example 2, and Comparative Example 1, and the luminance values of a portion facing the entire surface of the light guide plate was measured per pixel from the light extraction side of the wavelength conversion member by using an imaging color luminance meter (ProMetric (trade name), manufactured by Radiant Vision Systems) as a two-dimensional color luminance meter. The luminance value at which the luminance in the vicinity of the boundary between a portion of the wavelength conversion member facing one specific light-exiting portion and a portion of the wavelength conversion member facing the low-luminance portion was the smallest value was set as the luminance value $L_B$ of the boundary. In the vehicle lamps of Example 1, Example 2, and Comparative Example 1, the light was output from the corresponding light-exiting portions respectively having the same shape, and in the vehicle lamps, the luminance $L_B$ in the vicinity of the boundary was set such that the areas of the corresponding one light-exiting portion became the same area. The arithmetic average value of the total luminance value of the luminance values each having a value equal to or more than the luminance value $L_B$ as the boundary was derived as the average luminance value $Li_{ave}$ of the light-exiting portion. The arithmetic average value of the total luminance value of the luminance values each having a value less than the luminance $L_B$ as the boundary was derived as the average luminance value $Lo_{ave}$ of the low-luminance portion. Specifically, the measurement was performed in accordance with the procedures (a) to (j) described above. In Example 1, the number of pixels (the number of measurement points) of the light-exiting portion was about 312000 pixels (points).

The proportion of the average luminance value $Lo_{ave}$ of the low-luminance portion assuming the average luminance value $Li_{ave}$ of the light-exiting portion was 100% was obtained. ($Lo_{ave}/Li_{ave}\times 100(\%)$).

The differences Δli between the luminance values Li of the light-exiting portion measured per pixel and the average luminance value $Li_{ave}$ of the light-exiting portion was obtained by the following Formula (I), and the luminance unevenness E to be obtained by the following Formula (II) from the maximum value $\Delta li_{max}$ of the differences Δli, the minimum value $\Delta li_{min}$ of the differences Δli, and the average luminance value $Li_{ave}$ of the light-exiting portion was measured. Specifically, the measurement was performed in accordance with the procedures (k) to (n) described above. The results are shown in Table 1.

$$\Delta li = Li - Li_{ave} \quad \text{(I)}$$

$$E = \Delta li_{max}/Li_{ave} - \Delta li_{min}/Li_{ave} \quad \text{(II)}$$

Figure 14:
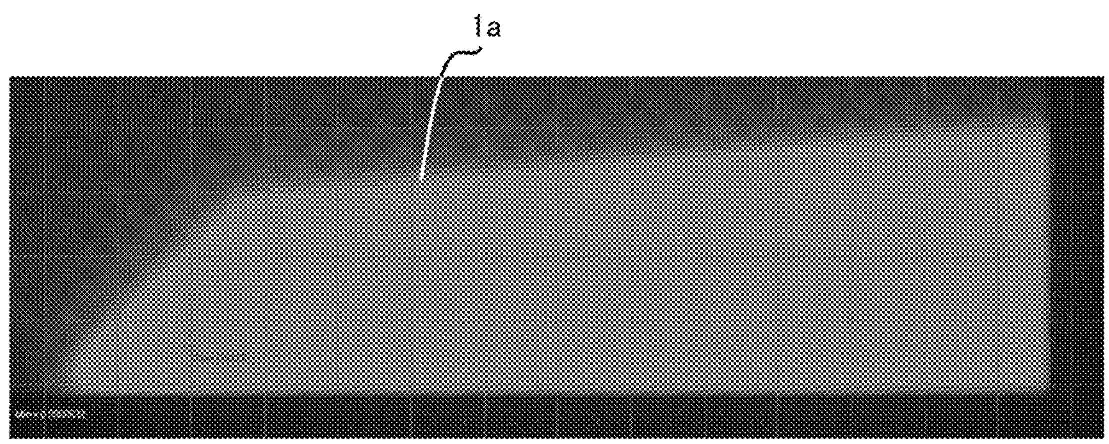
FIG. 14 is an appearance photograph of one light-exiting portion with light exiting, photographed from a light extraction side of a wavelength conversion member.
Figure 15:
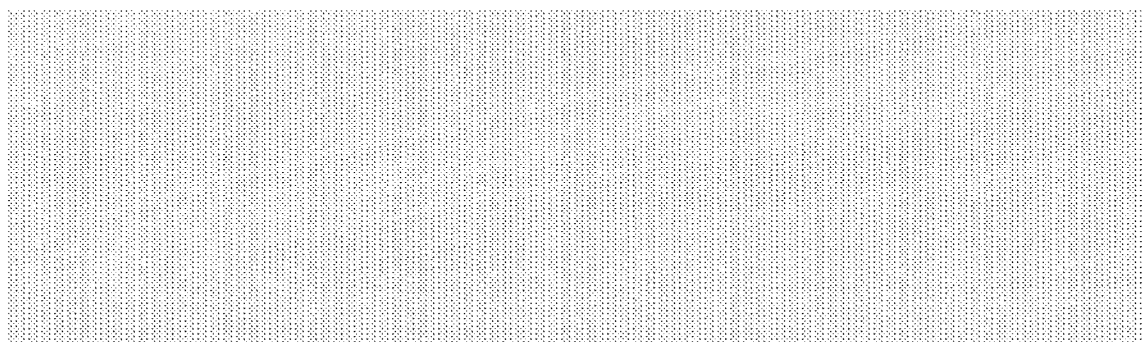
FIG. 15 illustrates each luminance value of a part of one light-exiting portion and a part of a low-luminance portion measured per pixel from the light extraction side of the wavelength conversion member.
Figure 16:
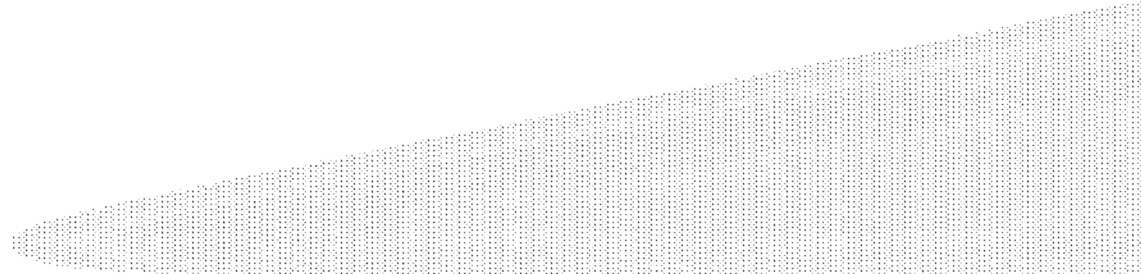
FIG. 16 illustrates each luminance value of a part of one light-exiting portion measured per pixel from the light extraction side of the wavelength conversion member.

FIG. 14 is an appearance photograph of one light-exiting portion with light exiting, photographed from a light extraction side of a wavelength conversion member in the vehicle lamp according to Example 1. FIG. 15 illustrates each luminance of a part of a portion facing one light-exiting portion and a part of a portion facing a low-luminance portion measured per pixel from the light extraction side of the wavelength conversion member in the vehicle lamp according to Example 1. FIG. 16 illustrates each luminance of a part of a portion facing one light-exiting portion measured per pixel from the light extraction side of the wavelength conversion member in the vehicle lamp according to Example 1.

TABLE 1

| | Proportion of low-luminance portion $Lo_{ave}/Li_{ave}$ × 100 (%) | Average luminance of light-exiting portion $Li_{ave}$ (cd/m$^2$) | Maximum value $\Delta Li_{max}$ (cd/m$^2$) | minimum value $\Delta Li_{min}$ (cd/m$^2$) | Luminance unevenness E |
|---|---|---|---|---|---|
| Example 1 | 5.4 | 829 | 259 | −479 | 0.9 |
| Example 2 | 5.5 | 797 | 178 | −457 | 0.8 |
| Comparative example 1 | 4.5 | 1096 | 2309 | −546 | 2.6 |

In the vehicle lamps according to Examples 1 and 2, the proportion of the average luminance value $Lo_{ave}$ of the low-luminance portion was 20% or less assuming the average luminance value $Li_{ave}$ of the light-exiting portion was 100%, the light extraction portion was partitioned into a plurality of regions, and light was output from each of the partitioned regions. In addition, in the vehicle lamps according to Examples 1 and 2, the luminance unevenness E was less than 1.5, and light with reduced luminance unevenness could be output from the light-exiting portion as one region produced by partitioning the light extraction portion into a plurality of regions. Although the vehicle lamp according to Example 1 did not include the diffusion plate, light exiting from the light-exiting portion was diffused by the wavelength conversion member, and light with reduced luminance unevenness was output from one light-exiting portion compared with the vehicle lamp according to Comparative Example 1 including the diffusion plate. In the vehicle lamp according to Example 2, because the diffusion plate was disposed on the light extraction side of the wavelength conversion member, the light emitted from the wavelength conversion member was further diffused by the diffusion plate, and the light with further reduced luminance unevenness was output.

Partly because the vehicle lamp according to Comparative Example 1 did not include a light source that emits light having a light emission peak wavelength in a range from 420 nm to 550 nm, the luminance unevenness E of light exiting from one light-exiting portion increased exceeding 1.5.

As illustrated in FIG. 14, because the vehicle lamp according to Example 1 could output light with reduced luminance unevenness from the light-exiting portion forming one section obtained by partitioning the region of the light extraction portion into a plurality of regions, light could exit from each one of the sections obtained by partitioning the region into the plurality of regions in the light extraction portion. When light can exit from individual partitioned sections, for example, animation display in which light is turned on so as to have a specific meaning for each section can be performed. In addition, when light with different colors each can exit from the corresponding one of the partitioned sections, the vehicle lamp can be used for a rear combination lamp that outputs white light for a backing light (back lamp), red light for both a brake light (stop) and a taillight (tail), and amber (orange) light for a direction indicator (turn signal).

The luminance value $L_B$ that was the smallest value indicating the boundary between the light-exiting portion and the low-luminance portion was derived from the respective luminance values of the portion facing the light guide plate measured per pixel from the light extraction side of the wavelength conversion member illustrated in FIG. 15, each luminance value less than the luminance value $L_B$ was deleted, and each luminance value Li equal to or more than the luminance value $L_B$ was left. Then, as illustrated in FIG. 16, each luminance value Li remained in the same shape as the light-exiting portion, and the average luminance value $Li_{ave}$ of the light-exiting portion of the total luminance value of the luminance values Li of the light-exiting portion, the differences Δli, the maximum value $\Delta li_{ma}$ of the differences Δli, and the minimum value $\Delta li_n$ in of the differences Δli were able to be calculated.

Examples 3 to 9

Wavelength conversion members of Examples 3 to 9 each containing a CASN phosphor having the composition represented by Formula (5) above and a silicone resin and each having the corresponding one of the thicknesses shown in Table 2 were provided. Table 2 shows the volume average particle diameter of the CASN phosphor and the parts by mass of the CASN phosphor per 100 parts by mass of the silicone resin used in the wavelength conversion member of the corresponding one of Examples. The following measurement described below was performed on the wavelength conversion member of each Example.

Examples 10 to 16

Wavelength conversion members of Examples 10 to 16 each having the corresponding one of the thicknesses shown in Table 2 were provided by using the CASN phosphor having the composition represented by Formula (5) above, a silicone resin, and aluminum oxide particles as a light diffusing agent. Table 2 shows the volume average particle diameter of the CASN phosphor and the parts by mass of the CASN phosphor per 100 parts by mass of the silicone resin used in the wavelength conversion member of the corresponding one of Examples. The following measurement was performed on each of the wavelength conversion members of Examples. The aluminum oxide particles as the light diffusing agent had a volume average particle diameter in a range from more than 0.4 μm to 0.5 μm as a catalog value measured by a laser diffraction method, and the purity of the aluminum oxide was 99.99 mass % or more.

The following measurement was performed on each of the wavelength conversion members according to Examples 3 to 16. The results are shown in Table 2. In Table 2, the symbol "-" indicates that the relevant item is not present and specifically indicates that the wavelength conversion member does not contain a light diffusing agent.

Volume Average Particle Diameter of Phosphor

The volume average particle diameter of the phosphor used in each of the wavelength conversion members of Examples was set to a particle diameter of cumulative 50% from the small diameter side in the particle size distribution based on volume. The particle size distribution based on volume of the phosphor was measured by using a laser diffraction particle size distribution measuring apparatus (Master Sizer 3000 manufactured by Malvern Panalytical).

Amount of Phosphor

Because the wavelength conversion members of Examples had the same area and respective different thicknesses, the product of the thickness of each wavelength conversion member and the content (parts by mass) of the phosphor per 100 parts by mass of the silicone resin being the light-transmissive member was calculated as the amount of the phosphor in consideration of the volume of the wavelength conversion member with the area taken as 1. Specifically, the amount of the phosphor in consideration of the volume of the wavelength conversion member was calculated by the following Formula (III).

$$\text{Amount of phosphor in consideration of wavelength conversion member} = 1\,(\mu m^2) \times \text{thickness of the wavelength conversion member}\,(\mu m) \times \text{amount of phospher per 100 parts by mass of light-transmissive member(parts by mass)} \quad \text{(III)}$$

Chromaticity Coordinates Before Passage Through Color Filter

For each of the wavelength conversion members of Examples, excitation light having a light emission peak wavelength of 449 nm was irradiated, and an emission spectrum of the wavelength conversion member at room temperature (25° C.) was measured by using a multichannel spectrometer (PMA-11, manufactured by HAMAMATSU PHOTONICS K.K.). By using the emission spectrum data of each wavelength conversion member, values of the chromaticity coordinates (x, y) in the Commission Internationale de l'Eclairage (CIE) 1931 color system were obtained.

Chromaticity Coordinates and Dominant Wavelength (λd) after Passage Through Color Filter For each of the wavelength conversion members of Examples, by using data of a transmittance curve of a color filter in which a transmittance of light having a wavelength in a range from 400 nm to 500 nm was 0% and a transmittance of light having a wavelength in a range from 610 nm to 700 nm was 60% or more, an emission spectrum of each of the wavelength conversion members after passage through a color filter disposed on the light extraction side of the wavelength conversion member was obtained by simulation. The values of the chromaticity coordinates (x, y) in the CIE1931 color system of the light emitted from each of the wavelength conversion members after passing through the color filter were obtained from the obtained emission spectrum data of each of the wavelength conversion members. In addition, the dominant wavelength (λd) of emission of each of the wavelength conversion members after passage through the color filter was obtained from the obtained emission spectrum data of the corresponding one of the wavelength conversion members. The dominant wavelength (λd) refers to a wavelength at a point where an extension line of connecting chromaticity coordinates (x=0.3333, y=0.3333) of white light and chromaticity coordinates (x, y) of emission of each of the wavelength conversion members after passage through the color filter by a straight line in the chromaticity coordinates in the CIE1931 color system intersects with a spectral locus.

Relative Luminous Intensity

For each of the wavelength conversion members of Examples, excitation light having a light emission peak wavelength of 449 nm was irradiated, and an emission spectrum of the wavelength conversion member at room temperature (25° C.) was measured by using a multichannel spectrometer (PMA-11, manufactured by HAMAMATSU PHOTONICS K.K.). Luminous intensity (cd) of emission of each of the wavelength conversion members after passage through a color filter when the color filter was disposed on the light extraction side of the wavelength conversion member was obtained through simulation. For the simulation, data of a transmittance curve of the color filter in which the transmittance of light with the wavelength in a range from 400 nm to 500 nm was 0% and the transmittance of light with the wavelength in a range from 610 nm to 700 nm was 60% or more was used. The relative luminous intensity (%) of each of the wavelength conversion members of Examples other than Example 10 was obtained assuming the luminous intensity of the wavelength conversion member of Example 10 was 100%.

TABLE 2

| | Phosphor | | Light diffusing agent | Wavelength coversion member | | | | | | | | | |
|---|---|---|---|---|---|---|---|---|---|---|---|---|---|
| | | | | | | | Before passage through color filter | | | After passage through color filter | | | |
| | Volume average particle diameter (μm) | Content (Parts by mass) | Content (Parts by mass) | Thickness (μm) | Amount of phosphor (Parts by mass) | Amount of phosphor (mg/cm$^2$) | Light emission peak wavelength (nm) | Chromaticity coordinate x | Chromaticity coordinate y | Chromaticity coordinate x | Chromaticity coordinate y | Dominant wavelength λd (nm) | Relative lumince intensity (%) |
| Example 3 | 5 | 130 | — | 19 | 2484 | 1.89 | 668 | 0.623 | 0.275 | 0.707 | 0.293 | 629 | 97 |
| Example 4 | 6 | 170 | — | 26 | 4354 | 3.10 | 666 | 0.636 | 0.280 | 0.707 | 0.293 | 629 | 110 |
| Example 5 | 8 | 190 | — | 28 | 5225 | 3.57 | 665 | 0.595 | 0.259 | 0.707 | 0.293 | 629 | 121 |
| Example 6 | 9 | 210 | — | 28 | 5822 | 3.80 | 666 | 0.542 | 0.232 | 0.706 | 0.294 | 629 | 127 |
| Example 7 | 16 | 210 | — | 62 | 13078 | 8.39 | 661 | 0.631 | 0.278 | 0.707 | 0.294 | 629 | 134 |
| Example 8 | 22 | 170 | — | 53 | 9067 | 6.31 | 668 | 0.446 | 0.181 | 0.707 | 0.293 | 629 | 127 |
| Example 9 | 27 | 170 | — | 70 | 11834 | 8.34 | 663 | 0.449 | 0.183 | 0.707 | 0.293 | 629 | 129 |
| Example 10 | 5 | 100 | 15 | 21 | 2128 | 1.68 | 665 | 0.594 | 0.261 | 0.706 | 0.294 | 629 | 100 |
| Example 11 | 6 | 120 | 15 | 23 | 2707 | 2.10 | 666 | 0.583 | 0.256 | 0.706 | 0.294 | 628 | 119 |

TABLE 2-continued

| | Phosphor | | Light diffusing agent | Wavelength conversion member | | | Before passage through color filter | | | After passage through color filter | | | |
|---|---|---|---|---|---|---|---|---|---|---|---|---|---|
| | Volume average particle diameter (μm) | Content (Parts by mass) | Content (Parts by mass) | Thick-ness (μm) | Amount of phosphor (Parts by mass) | Amount of phosphor ($mg/cm^2$) | Light emission peak wavelength (nm) | Chromaticity coordinate x | Chromaticity coordinate y | Chromaticity coordinate x | Chromaticity coordinate y | Dominant wavelength λd (nm) | Relative lumince intensity (%) |
| Example 12 | 8 | 140 | 15 | 25 | 3516 | 2.55 | 665 | 0.585 | 0.256 | 0.706 | 0.294 | 629 | 123 |
| Example 13 | 9 | 210 | 15 | 28 | 5903 | 3.70 | 663 | 0.601 | 0.264 | 0.706 | 0.294 | 629 | 125 |
| Example 14 | 16 | 210 | 15 | 55 | 11515 | 7.27 | 663 | 0.665 | 0.296 | 0.706 | 0.294 | 629 | 127 |
| Example 15 | 22 | 190 | 15 | 56 | 10651 | 6.97 | 665 | 0.645 | 0.284 | 0.707 | 0.293 | 630 | 118 |
| Example 16 | 27 | 170 | 15 | 62 | 10502 | 7.19 | 667 | 0.625 | 0.276 | 0.706 | 0.294 | 629 | 123 |

Each of the wavelength conversion members according to Examples 3 to 16 wavelength-converted the light of excitation light having a light emission peak wavelength of 449 nm to emit light having a light emission peak wavelength in a range from 540 nm to 700 nm before passage through the color filter.

In the wavelength conversion members according to Examples 3 to 16, the volume average particle diameter of the phosphor was in a range from 5 μm to 35 μm, and the thickness of the wavelength conversion member could be reduced to within a range from 18 μm to 100 μm. In the wavelength conversion members according to Examples 3 to 16, even when the thickness was thin, in a range from 18 μm to 100 μm, the volume average particle diameter of the phosphor was as small as in a range from 5 μm to 35 μm, thus, the amount of the phosphor in consideration of the volume of the wavelength conversion member was in a range from 2000 parts by mass to 14000 parts by mass. Therefore light having a desired dominant wavelength and relatively high relative luminous intensity was emitted after passage through the color filter. In addition, each of the wavelength conversion members according to Examples 3 to 9 that did not contain a light diffusing agent did not have a significant decrease in relative luminous intensity and had similar extent of relative luminous intensity compared with each of the wavelength conversion members according to Examples 10 to 16 containing the light diffusing agent. Even when the wavelength conversion member did not contain a light diffusing agent, the light having sufficiently high luminous intensity was emitted.

In the wavelength conversion members according to Examples 3 to 16, the volume average particle diameter of the phosphor was in a range from 5 μm to 35 μm. The mass (mg) of the phosphor relative to the area ($cm^2$) of the wavelength conversion member was in a range from 1.50 $μmg/cm^2$ to 9.00 $μmg/cm^2$, and thus the thickness could be reduced.

In each of the wavelength conversion members according to Examples 4 to 9 and Examples 11 to 16, the volume average particle diameter of the phosphor was in a range from 6 μm to 30 μm, and the thickness of the wavelength conversion member could be in a range from 20 μm to 70 μm. In the wavelength conversion members according to Examples 4 to 9 and Examples 11 to 16, even when the thickness was as thin as in a range from 20 μm to 70 μm, the amount of the phosphor in consideration of the volume of the wavelength conversion member was in a range from 2500 parts by mass to 14000 parts by mass, light having a desired dominant wavelength was emitted after passage through the color filter, the relative luminous intensity exceeded 100% compared with Example 3 or Example 10, and light having high relative luminous intensity was emitted.

In each of the wavelength conversion members according to Examples 4 to 9 and Examples 11 to 16, the volume average particle diameter of the phosphor is in a range from 6 μm to 30 μm, and the mass (mg) of the phosphor relative to the area ($cm^2$) of the wavelength conversion member is in a range from 2.00 $mg/cm^2$ to 8.50 $mg/cm^2$. Thus, the thickness could be reduced, and the light having the high relative luminous intensity could be emitted.

In each of the wavelength conversion members according to Examples 4 to 6 and Examples 11 to 13, the volume average particle diameter of the phosphor was in a range from 6 μm to 15 μm, and the thickness of the wavelength conversion member could be in a range from 22 μm to 30 μm. In the wavelength conversion members according to Examples 4 to 6 and Examples 11 to 13, even when the thickness was as thin as in a range from 22 μm to 30 μm, the amount of the phosphor in consideration of the volume of the wavelength conversion member was in a range from 2500 parts by mass to 6000 parts by mass, light having a desired dominant wavelength was emitted after passage through the color filter, the relative luminous intensity exceeded 100% compared with Example 3 or 10, and light having high relative luminous intensity was emitted.

In each of the wavelength conversion members according to Examples 4 to 6, the volume average particle diameter of the phosphor was in a range from 6 μm to 15 μm, and, when the wavelength conversion member did not contain a light diffusing agent, the mass (mg) of the phosphor relative to the area ($cm^2$) of the wavelength conversion member could be in a range from 3.00 $μmg/cm^2$ to 4.00 $μmg/cm^2$, the thickness of the wavelength conversion member could be reduced, and the light having the high relative luminous intensity could be emitted.

In each of the wavelength conversion members according to Examples 11 to 13, the volume average particle diameter of the phosphor was in a range from 6 μm to 15 μm, and, when the wavelength conversion member containing a phosphor contained a light diffusing agent, a mass (g) of the phosphor relative to the area ($cm^2$) of the wavelength conversion member could be in a range from 2.00 $mg/cm^2$ to 4.00 $mg/cm^2$. Compared to a case of not containing a light diffusing agent, the wavelength conversion member could have a reduced thickness even with the small amount of the phosphor relative to the area of the wavelength conversion member, and the light having the high relative luminous intensity could be emitted.

INDUSTRIAL APPLICABILITY

The vehicle lamp of the present disclosure can be used for a rear combination lamp of a vehicle used for a road transport vehicle, such as a motorcycle and an automatic four-wheeled vehicle, a railway vehicle, and a vehicle-based construction machine, such as a tractor-based construction machine like a land-leveling, transporting, and loading machine, or a shovel-based construction machine, such as an excavator machine.

What is claimed is:

1. A vehicle lamp, comprising:

a light guide plate comprising:

a plurality of light-exiting portions, and a low-luminance portion that is located between adjacent light-exiting portions of the plurality of light-exiting portions, and is configured to output light having luminance lower than luminance of light exiting from the light-exiting portions;

a plurality of light sources individually configured to emit light having a light emission peak wavelength in a range from 420 nm to 550 nm to enter the light guide plate; and at least one wavelength conversion member disposed above the plurality of light-exiting portions and configured to emit light having a light emission peak wavelength in a range from 540 nm to 700 nm by converting a wavelength of the light exiting from the plurality of light-exiting portions, wherein the light-exiting portions are formed protrusions and recessions in the light guide plate on the light-exiting portion side, and on an opposite side of the light-exiting portions, the low-luminance portion are not formed the protrusions and recessions and wherein the wavelength conversion member contains at least one kind of phosphor and the wavelength conversion member covers a light extraction side of the plurality of light-exiting portions.

2. The vehicle lamp according to claim 1, wherein when luminance values of a portion of the wavelength conversion member facing one of the plurality of light-exiting portions are measured per pixel from a light extraction side of the wavelength conversion member by using a two-dimensional color luminance meter, and assuming an average luminance value $Li_{ave}$ of the one light-exiting portion as an arithmetic average value of a total luminance value of the luminance values measured per pixel is 100%, a proportion of an average luminance value $Lo_{ave}$ of the low-luminance portion as an arithmetic average value of a total luminance value of luminance values of a portion of the wavelength conversion member facing the low-luminance portion measured per pixel from the light extraction side of the wavelength conversion member is 20% or less.

3. The vehicle lamp according to claim 1, wherein the wavelength conversion member covers a light extraction side of the plurality of light-exiting portions.

4. The vehicle lamp according to claim 1, wherein a plurality of the wavelength conversion members each cover a light extraction side of a corresponding one of the plurality of light-exiting portions.

5. The vehicle lamp according to claim 1, wherein luminance values of a portion of the wavelength conversion member facing one of the plurality of light-exiting portions are measured per pixel by using a two-dimensional color luminance meter, an average luminance value $Li_{ave}$ of the one light-exiting portion as an arithmetic average value of a total luminance value of luminance values Li of the one light-exiting portion measured per pixel and differences $\Delta li$ between the luminance values Li and the average luminance value $Li_{ave}$ are obtained from the following Formula (I), and a luminance unevenness E obtained by the following Formula (II) with a maximum value $\Delta li_{max}$ of the differences $\Delta li$, a minimum value $\Delta l_{imin}$ of the differences $\Delta li$, and the average luminance value $Li_{ave}$ is less than 1.5, $$\Delta li = Li - Li_{ave} \quad (I)$$

$$E = \Delta Li_{max}/Li_{ave} - \Delta Li_{min}/Li_{ave}. \quad (II)$$

6. The vehicle lamp according to claim 1, further comprising:

a diffusion plate disposed on a light extraction side of the wavelength conversion member; and/or a diffusion plate disposed on a side opposite to the light extraction side of the wavelength conversion member.

7. The vehicle lamp according to claim 1, further comprising a prism sheet disposed on a light extraction side of the wavelength conversion member.

8. The vehicle lamp according to claim 1, further comprising a reflection layer disposed on a side opposite to a light extraction side of one of the plurality of light-exiting portions.

9. The vehicle lamp according to claim 1, further comprising a dichroic mirror disposed on a side opposite to a light extraction side of one of the plurality of light-exiting portions.

10. The vehicle lamp according to claim 1, wherein a thickness of the wavelength conversion member is in a range from 18 μm to 100 μm.

11. The vehicle lamp according to claim 1, wherein the wavelength conversion member contains at least one kind of phosphor selected from the group consisting of a rare-earth-aluminate phosphor having a composition represented by the following Formula (1), a first nitride phosphor having a composition represented by the following Formula (2), a second nitride phosphor having a composition represented by the following Formula (3), a third nitride phosphor having a composition represented by the following Formula (4), a fourth nitride phosphor having a composition represented by the following Formula (5), a fifth nitride phosphor having a composition represented by the following Formula (6), a first fluoride phosphor having a composition represented by the following Formula (7), and a second fluoride phosphor having a composition represented by the following Formula (8), (1)

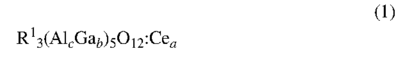

$R^1_3(Al_cGa_b)_5O_{12}$:$Ce_a$ wherein in Formula (1), $R^1$ is at least one kind selected from the group consisting of Y, Gd, Lu and Tb, and a, b, and c satisfy $0<a\leq 0.22$, $0\leq b\leq 0.4$, $0<c\leq 1.1$, and $0.9\leq b+c\leq 1.1$, (2)

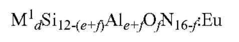

wherein in Formula (2), $M^1$ contains at least one kind of element selected from the group consisting of Li, Mg, Ca, Sr, Y, and lanthanoid elements, excluding La and Ce, and d, e, and f satisfy $0<d\leq 2.0$, $2.0\leq e\leq 6.0$, and $0\leq f\leq 1.0$, respectively, (3)

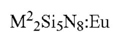

wherein in Formula (3), $M^2$ is an alkaline earth metal element containing at least one kind selected from the group consisting of Ca, Sr, and Ba, (4)

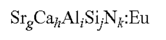

wherein in Formula (4), g, h, i, j, and k satisfy $0\leq g<1$, $0<h\leq 1$, $g+h\leq 1$, $0.9\leq i\leq 1.1$, $0.9\leq j\leq 1.1$, and $2.5\leq k\leq 3.5$, (5)

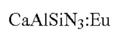

(6)

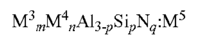

wherein in Formula (6), $M^3$ is at least one kind of element selected from the group consisting of Ca, Sr, Ba, and Mg, $M^4$ is at least one kind of element selected from the group consisting of Li, Na, and K, $M^5$ is at least one kind of element selected from the group consisting of Eu, Ce, Tb, and Mn, and m, n, p, and q satisfy $0.80\leq m\leq 1.05$, $0.80\leq n\leq 1.05$, $0\leq p\leq 0.5$, and $3.0\leq q\leq 5.0$, respectively, (7)

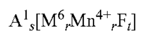

wherein in Formula (7), $A^1$ is at least one kind of ion selected from the group consisting of $K^+$, $Li^+$, $Na^+$, $Rb^+$, $Cs^+$, and $NH_4^+$, $M^6$ is at least one kind of element selected from the group consisting of Group 4 elements and Group 14 elements, r satisfies $0<r<0.2$, s is an absolute value of electric charge of $[M^6_{1-r}Mn^{4+}_rF_t]$ ion, and t satisfies $5<t<7$, (8)

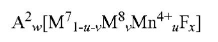

wherein in Formula (8), $A^2$ is at least one kind of ion selected from the group consisting of $K^+$, $Li^+$, $Na^+$, $Rb^+$, $Cs^+$, and $NH_4^+$, $M^7$ is at least one kind of element selected from the group consisting of Group 4 and Group 14, $M^8$ is at least one kind of element selected from the group consisting of Group 13, u satisfies $0<u<0.2$, w is an absolute value of ELECTRIC CHARGE OF $[M^7_{1-u-v}M^8_vMn^{4+}F_x]$ ion, v satisfies $0<v\leq 0.1$, and x satisfies $5<x<7$.

12. The vehicle lamp according to claim 1, further comprising:

a lamp body comprising a light extraction portion; and a cover disposed at the light extraction portion, wherein the vehicle lamp emits light to pass through the cover and outputs light in a region R, the region R being defined by a first R straight line connecting a first R point and a second R point, a second R straight line connecting the second R point and a third R point, a third R straight line connecting the third R point and a fourth R point, and a fourth R straight line connecting the fourth R point and the first R point, wherein in a CIE1931 chromaticity diagram, the first R point has chromaticity coordinates (x=0.645, y=0.335), the second R point has chromaticity coordinates (x=0.665, y=0.335), the third R point has chromaticity coordinates (x=0.735, y=0.265), and the fourth R point has chromaticity coordinates (x=0.721, y=0.259).

13. The vehicle lamp according to claim 12, wherein at least one of the plurality of light sources emits light having a light emission peak wavelength in a range from 420 nm to 470 nm.

14. The vehicle lamp according to claim 1, further comprising:

a lamp body comprising a light extraction portion; and a cover disposed at the light extraction portion, wherein the vehicle lamp emits light to pass through the cover and outputs light in a region A, the region A being defined by a first A straight line connecting a first A point and a second A point, a second A straight line connecting the second A point and a third A point, a third A straight line connecting the third A point and a fourth A point, and a fourth A straight line connecting the fourth A point and the first A point, wherein in a CIE1931 chromaticity diagram, the first A point has chromaticity coordinates (x=0.545, y=0.425), the second A point has chromaticity coordinates (x=0.557, y=0.442), wherein the third A point has chromaticity coordinates (x=0.609, y=0.390), and the fourth A point has chromaticity coordinates (x=0.597, y=0.390).

15. The vehicle lamp according to claim 14, wherein at least one of the plurality of light sources emits light having a light emission peak wavelength in a range from 500 nm to 550 nm.

16. The vehicle lamp according to claim 1, further comprising:

a lamp body comprising a light extraction portion; and a cover disposed at the light extraction portion, wherein the vehicle lamp emits light to pass through the cover and outputs light in a region W, the region W being defined by a first W straight line connecting a first W point and a second W point, a second W straight line connecting the second W point and a third W point, a third W straight line connecting the third W point and a fourth W point, a fourth W straight line connecting the fourth W point and a fifth W point, a fifth W straight line connecting the fifth W point and a sixth W point, and a sixth W straight line connecting the sixth W point and the first W point, wherein in a CIE1931 chromaticity diagram, the first W point has chromaticity coordinates (x=0.310, y=0.348), the second W point has chromaticity coordinates (x=0.453, y=0.440), the third W point has chromaticity coordinates (x=0.500, y=0.440), the fourth W point has chromaticity coordinates (x=0.500, y=0.382), the fifth W point has chromaticity coordinates (x=0.443, y=0.382), and the sixth W point has chromaticity coordinates (x=0.310, y=0.283).

17. The vehicle lamp according to claim 16, wherein at least one of the plurality of light sources emits light having a light emission peak wavelength in a range from 470 nm to 500 nm.

18. The vehicle lamp according to claim 11, wherein a volume average particle diameter of the phosphor is in a range from 5 μm to 35 μm.

19. The vehicle lamp according to claim 11, wherein an amount of a phosphor per volume of the wavelength conversion member represented by a product of a thickness of the wavelength conversion member having equal area and a content (parts by mass) of the phosphor in the wavelength conversion member per 100 parts by mass of a light-transmissive material in the wavelength conversion member is in a range from 2000 parts by mass to 14000 parts by mass.

20. The vehicle lamp according to claim 1, further comprising a color filter having a transmittance that is 5% or less with respect to light having a wavelength in a range from 400 nm to 500 nm and a transmittance that is 60% or more with respect to light having a wavelength in a range from 610 nm to 700 nm.

* * * * *